(12) United States Patent
Makinoshima et al.

(10) Patent No.: US 11,553,323 B2
(45) Date of Patent: Jan. 10, 2023

(54) COMPUTER-READABLE RECORDING MEDIUM, INFORMATION PROCESSING METHOD, AND INFORMATION PROCESSING DEVICE

(71) Applicant: FUJITSU LIMITED, Kawasaki (JP)

(72) Inventors: Fumiyasu Makinoshima, Kawasaki (JP); Yusuke Oishi, Yokohama (JP); Takashi Yamazaki, Kawasaki (JP); Takao Higashiyama, Chiba (JP)

(73) Assignee: FUJITSU LIMITED, Kawasaki (JP)

( * ) Notice: Subject to any disclaimer, the term of this patent is extended or adjusted under 35 U.S.C. 154(b) by 61 days.

(21) Appl. No.: 17/191,967

(22) Filed: Mar. 4, 2021

(65) Prior Publication Data
US 2021/0297838 A1    Sep. 23, 2021

(30) Foreign Application Priority Data
Mar. 23, 2020    (JP) .............................. JP2020-051788

(51) Int. Cl.
*H04W 24/00*    (2009.01)
*H04M 11/04*    (2006.01)
(Continued)

(52) U.S. Cl.
CPC .............. *H04W 4/90* (2018.02); *G06V 20/53* (2022.01); *H04W 4/023* (2013.01); *H04W 4/029* (2018.02)

(58) Field of Classification Search
CPC ....... H04W 4/90; H04W 4/023; H04W 4/029; G06V 20/53
See application file for complete search history.

(56) References Cited

U.S. PATENT DOCUMENTS

2015/0296358 A1* 10/2015 Akutsu ................. H04W 4/029
455/404.2

FOREIGN PATENT DOCUMENTS

| JP | 2007-334628 A | 12/2007 |
| JP | 2011-237917 A | 11/2011 |

(Continued)

OTHER PUBLICATIONS

Kentaro Kumagai et al., "A Study on Influence of Leading Evacuees and IoT-enhanced Information System to Induce Tsunami Evacuation", The 55th Engineering Project Workshop, Lecture No. 55, pp. 1-6, Kyoto University Research Infomnation Repository Kurenai, Jun. 2017 (Total 7 pages) [online] http://hdl.handle.net/2433/225283 (Internet Search Mar. 6, 2020).

(Continued)

*Primary Examiner* — Erika A Washington
(74) *Attorney, Agent, or Firm* — Fujitsu Patent Center

(57) ABSTRACT

Information for determining whether to evacuate or not is provided to a user by a computerized process. The process includes: acquiring a number of evacuees for each of a plurality of targets corresponding to a predetermined user; selecting a target of the plurality of targets based on the acquired numbers of evacuees for the plurality of targets and importance levels respectively set for the plurality of targets; and associating information on the selected target with information on the acquired number of evacuees for the selected target and outputting the information on the selected target and the information on the acquired number of evacuees for the selected target to the predetermined user.

17 Claims, 19 Drawing Sheets

(51) Int. Cl.
  *H04W 4/90* (2018.01)
  *H04W 4/029* (2018.01)
  *H04W 4/02* (2018.01)
  *G06V 20/52* (2022.01)

(56) References Cited

FOREIGN PATENT DOCUMENTS

| JP | 5636518 B1 | * | 12/2014 | ............ H04W 4/02 |
| JP | 2015125733 A | * | 7/2015 | |

OTHER PUBLICATIONS

"Analysis Result of Interview—Survey (of residents) on Evacuate Behaviors in the Great Eastern Japan Earthquake in Heisei 23 (2011)", 7th Meeting; Expert Investigation Group for Earthquake & Tsunami with a Lesson in Touhoku-Area Pacific-Sea Offshore Earthquake, Partial Translation. (Total 17 pages) [online] http://www.bousai.go.jp/kaigirep/chousakai/tohokukyokun/7/pdf/1.pdf (Internet Search Mar. 6, 2020).

Tarou Hagami, "We're Going to Escape", SNS urged the evacuations at that time. One year from the Western Japan Heavy rain. Unknown Lessons., Bunshun Online, Jul. 6, 2019, Partial Translation. (Total 5 pages) [online] https://bunshun.jp/articles/-/12695 (Internet Search Mar. 6, 2020).

Fsunami Evacuation Training Application Nige-Tore, Good Design Award 2018 (good design gold award), Nige-Tore Development Team (Kyoto University Disaster-Prevention Research Yamori Labo & GK Kyoto & R2 Media Solution & Disaster Prevention Science Labo), Partial Translation (Total 4 pages) [online] https://www.g-mark.org/award/describe/48136 (Internet Search Mar. 6, 2020).

* cited by examiner

FIG. 4

| EVACUATION SITE | ID | POSITION x | POSITION y | NUMBER OF EVACUEES AT (t) | NUMBER OF EVACUEES AT (t-1) |
|---|---|---|---|---|---|
| ○○ | 1 | ... | ... | ... | ... |
| △△ | 2 | ... | ... | ... | ... |
| ◇◇ | 3 | ... | ... | ... | ... |

| ID | POSITION x AT (t) | POSITION y AT (t) | POSITION x AT (t-1) | POSITION y AT (t-1) | STATE |
|---|---|---|---|---|---|
| 1 | ... | ... | | | active |
| 2 | ... | ... | | | ... |
| 3 | ... | ... | | | ... |

| EVACUEE ID | xx-km RANGE ID | yy-km RANGE ID |
|---|---|---|
| 1 | aaa, bbb | aaa, bbb, ccc |
| 2 | ccc | aaa, bbb, ccc |
| 3 | ddd, eee | ddd, eee, fff |

COMPUTER-READABLE RECORDING MEDIUM, INFORMATION PROCESSING METHOD, AND INFORMATION PROCESSING DEVICE

CROSS-REFERENCE TO RELATED APPLICATION

This application is based upon and claims the benefit of priority of the prior Japanese Patent Application No. 2020-51788, filed on Mar. 23, 2020, the entire contents of which are incorporated herein by reference.

FIELD

The embodiment discussed herein is related to a computer-readable recording medium, an information processing method, and an information processing device.

BACKGROUND

When a disaster, such as an earthquake or a flood, occurs, information on the disaster is provided to residents based on the situation of the disaster. This prompts the residents to appropriately evacuate. The information on the disaster is, for example, evacuation information indicating preparation for evacuation, an evacuation order, an evacuation instruction, or the like, and may be provided to residents via televisions, radios, the Internet, administrative radio, a publicity vehicle, and the like. The information on the disaster is, for example, provided by an administrative institution, such as a national ministry or a national agency, a private institution designated by the country, and the like. The administrative institution and the private institution are referred to as "public institutions" in some cases. For example, the public institutions may provide, to residents, a hazard map indicating risk of disasters for each of regions.

As a related technique, for example, there is a technique for determining evacuation statuses of persons affected by a disaster based on a list of persons who are affected by the disaster and have to evacuate to evacuation sites and identification information that identifies the persons affected by the disaster and has been read by integrated circuit (IC) tag readers installed in the evacuation sites from radio IC tags that are portable by the persons affected by the disaster. An example of related art is Japanese Laid-open Patent Publication No. 2007-334628.

SUMMARY

According to an aspect of the embodiments, a computerized method includes: acquiring a number of evacuees for each of a plurality of targets corresponding to a predetermined user; selecting any of the plurality of targets based on the acquired numbers of evacuees for the plurality of targets and importance levels set respectively for the plurality of targets; and associating information on the selected target with information on the acquired number of evacuees for the selected target and outputting the information on the selected target and the information on the acquired number of evacuees for the selected target to the user.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an explanatory diagram illustrating an example of details stored in an evacuation site management table;

FIG. 5 is an explanatory diagram illustrating an example of details stored in a user information management table;

FIG. 6 is an explanatory diagram illustrating an example of details stored in a peripheral information management table;

DESCRIPTION OF EMBODIMENTS

In existing techniques, residents may not appropriately determine whether to evacuate. For example, even when a resident receives information on a disaster from a public institution in a situation in which the resident has to evacuate, the resident may determine, due to normalcy bias, that the resident does not have to evacuate.

According to an aspect, an object of the disclosure is to enable a user to appropriately determine whether to evacuate.

An embodiment of an information processing program disclosed herein, an information processing method disclosed herein, and an information processing device disclosed herein is described in detail with reference to the drawings.

(Example of Information Processing Method According to Embodiment)

Figure 1:
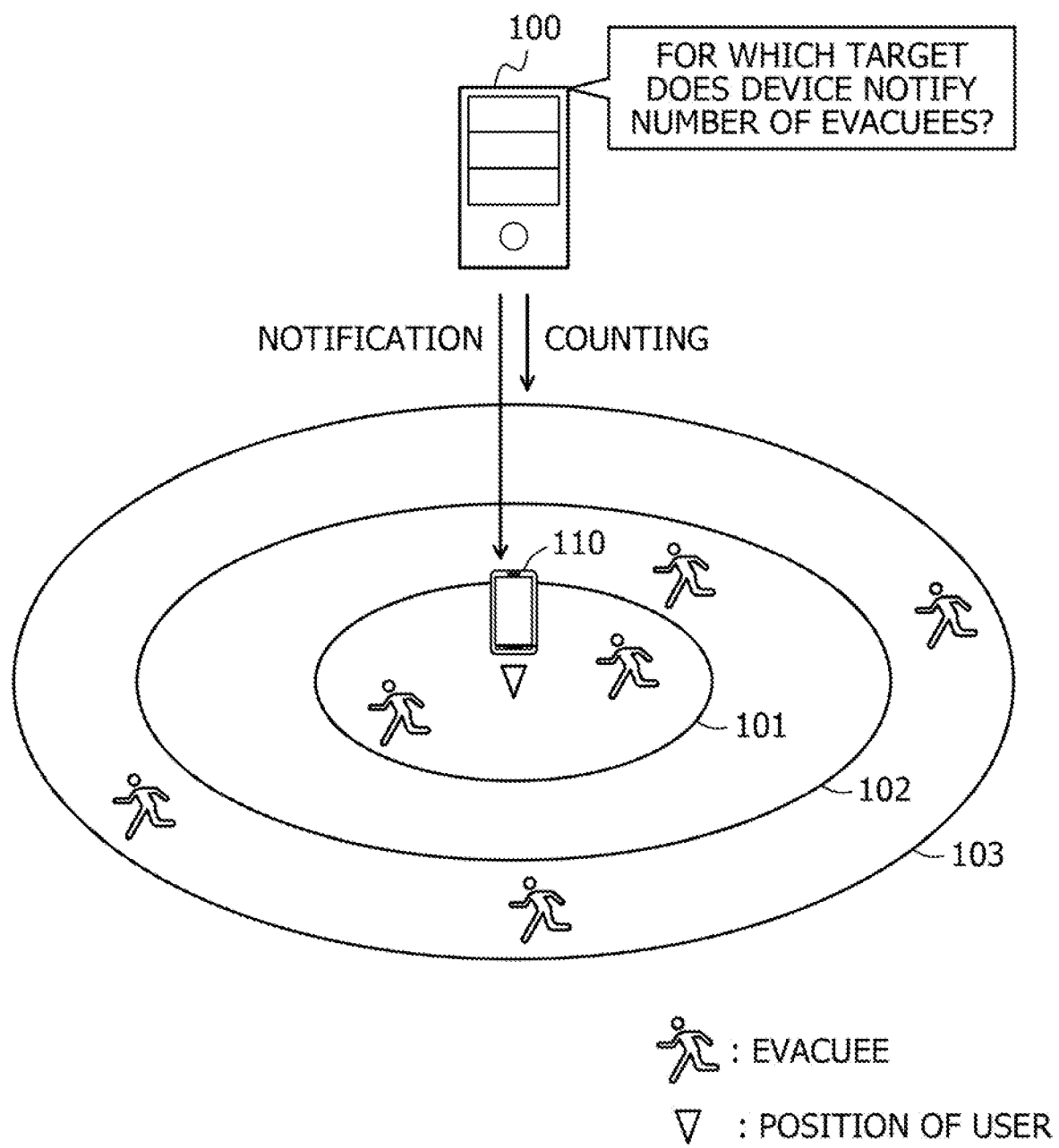
FIG. 1 is an explanatory diagram illustrating an example of an information processing method according to an embodiment.

FIG. 1 is an explanatory diagram illustrating an example of an information processing method according to the embodiment. An information processing device 100 is a computer that may enable a predetermined user to appropriately determine whether to evacuate. The predetermined user is, for example, a resident who lives in any site.

When a disaster, such as an earthquake or a flood, occurs, a public institution provides information on the disaster to residents based on the situation of the disaster to prompt the residents to appropriately evacuate. The information on the disaster includes, for example, evacuation information indicating preparation for evacuation, an evacuation order, an evacuation instruction, or the like, and a hazard map indicating risk of disasters for each of regions.

However, even when the residents receive the information on the disaster from the public institution in a situation in which the residents have to evacuate, the residents may determine, due to normalcy bias, that the residents do not have to evacuate, and may be late to evacuate. The normalcy bias is a state of mind in which people perceive that they are exceptionally safe. As a result, the residents may not appropriately evacuate and may suffer damage from the disaster. It is considered that only providing the information on the disaster from the public institution to the residents may not be sufficient to prompt the residents to evacuate.

The following Reference Document 1 describes the case where, when a disaster occurred in the past, some residents referenced behaviors of other persons having relatively deep relationships with the residents, properly determined whether to evacuate, and appropriately evacuated.

Reference Document 1: Kentaro Kumagai and Kenji Ono, "A Study on Influence of Leading Evacuees and IoT-enhanced Information System to Induce Tsunami Evacuation" Proceedings of Infrastructure Planning No. 55 (2017)

For example, there is the case where, when the Great East-Japan Earthquake and Tsunami occurred on Mar. 11, 2011, some residents started evacuating against the tsunami after witnessing other residents who were evacuating. For example, there is the case where, when the Western Japan Floods and Rain Disaster occurred in the time period from Jun. 28 to Jul. 8, 2018, some residents started evacuating after recognizing, via social networking services (SNSs), that other familiar residents evacuated.

For this case, the following method is considered. The method is to prompt residents to appropriately evacuate by providing, to the residents, information indicating evacuation statuses of other residents that have been observed for any target so that the residents are able to reference the information when a disaster occurs. The target is a range or site for which the evacuation statuses of the residents have been observed. However, even when this method is used, the residents may not appropriately determine whether to evacuate.

For example, in a situation in which residents have to evacuate, the residents may be adversely affected by majority synching bias and may determine that the residents do not have to evacuate. The majority synching bias is a state of mind in which people try to take the same action as other persons. For example, when a relatively small number of other residents are evacuating, residents may determine that the residents do not have to evacuate like other residents, regardless of a situation in which the residents have to evacuate, and the residents may be late to evacuate. As a result, the residents may not appropriately evacuate and may suffer damage from a disaster.

As described above, when a public institution prompts residents to reference information indicating evacuation statuses of other residents, the residents may not appropriately determine whether to evacuate. For example, residents may not evacuate due to the fact that some residents do not evacuate. As a result, many residents may not evacuate and the number of residents who suffer damage from a disaster may increase.

For example, residents tend not to place importance on information indicating evacuation statuses of other residents having relatively weak relationships with the residents. Even when the other residents evacuate, the residents may determine that the residents do not have to evacuate, and may be late to evacuate. For example, even when other residents who live in a site relatively far from a site in which concerned residents live are evacuating, the concerned residents may determine that the concerned residents do not have to evacuate. For example, even when other residents who have relatively weak relationships with concerned residents and are not relatives, friends, or acquaintances of the concerned residents are evacuating, the concerned residents may determine that the concerned resident does not have to evacuate. As a result, the residents may not appropriately evacuate and may suffer damage from a disaster.

For example, when residents are able to reference information indicating evacuation statuses of other residents that have been observed for various targets, it may be difficult for the residents to determine information on which the residents have to place importance, and the residents may place importance on information that is favorable to the residents. Therefore, the residents may determine that the residents do not have to evacuate, and may be late to evacuate. For example, it is considered that residents may be able to reference information that indicates evacuation statuses observed for various targets and is information indicating evacuation statuses on a city-by-city basis, information indicating evacuation statuses on a town-by-town basis, information indicating evacuation statuses in units of several neighboring homes, and the like. When the ratio of the number of other residents who are evacuating on a town-by-town basis is relatively high, and the ratio of the number of other residents who are evacuating on a city-by-city basis is relatively low, the concerned residents may determine that the concerned resident does not have to evacuate. As a result, the residents may not appropriately evacuate and may suffer damage from a disaster.

For example, in an emergency case in which a disaster occurs, an operation time period for residents to reference information indicating evacuation statuses of other residents that have been observed for various targets may be long. As a result, time periods for the residents to determine whether to evacuate may be long. Therefore, the residents may be late to evacuate. It is considered that the residents may not reference the information indicating the evacuation statuses of the other residents that have been observed for the various targets, because the residents may not prefer a long operation time period for referencing the information.

Based on the above description, it is considered to be preferable to appropriately determine whether to provide, to residents, information indicating evacuation statuses of other residents that have been observed for any target at any time point, and to be preferable to select various information and provide the selected information to the residents. The embodiment describes an information processing method for providing appropriate information to each of residents at appropriate time so that each of the residents may appropriately determine whether to evacuate.

In an example illustrated in FIG. 1, a plurality of targets corresponding to a predetermined user are present. The plurality of targets are, for example, ranges or sites for which evacuees are to be counted. The ranges are physical ranges or logical ranges. The logical ranges are, for example, set based on depths of relationships with the predetermined user. The logical ranges are, for example, ranges including relatives, friends, and acquaintances of the predetermined user. The plurality of targets are, for example, a plurality of physical ranges 101 to 103 that have different areas and are based on a position corresponding to the predetermined user. The range 102 includes the range 101. The range 103 includes the ranges 101 and 102.

For example, a method for counting evacuees for a certain target is a counting method based on a characteristic of the target. For example, methods for counting evacuees for the respective targets may be of the same type. For example, a method for counting evacuees for any of the plurality of targets may be of a type different from a method for counting evacuees for another one of the plurality of targets. For example, it is considered that, in counting of evacuees for a certain target, persons who have completely evacuated are treated as evacuees, or persons who are evacuating and have completely evacuated are treated as evacuees, or persons who are evacuating are treated as evacuees. Definitions of persons treated as evacuees may be different for the targets.

Importance levels are set for the plurality of targets. Each of the importance levels is, for example, an index value indicating how effective it is to prompt the predetermined user to evacuate when the number of evacuees counted for a target for which the importance level is set is referenced by the predetermined user. The importance levels are, for example, index values corresponding to the depths of the relationships between the targets and the predetermined user. Therefore, each of the importance levels indicates that, as the importance level set for a target becomes larger, a priority with which the predetermined user is prompted to reference the number of evacuees counted for the target becomes higher.

For example, it is considered that a relatively high importance level is set for a target that is among the plurality of targets and has a relatively deep relationship with the predetermined user. For example, a relatively high importance level is set for a target that is among the plurality of targets and is present close to the position corresponding to the predetermined user. Each of the targets is determined such that, as the target becomes closer to the position corresponding to the predetermined user, an effect in which the number of evacuees counted for the target prompts the predetermined user to evacuate becomes larger and a priority with which the predetermined user is prompted to reference the number of evacuees counted for the target becomes higher.

(1-1) The information processing device 100 acquires the number of evacuees for each of the plurality of targets. The information processing device 100 counts evacuees for each of the targets, thereby acquiring the number of evacuees for each of the targets. For example, the information processing device 100 acquires the position of a terminal device used by the concerned person and counts evacuees for each of the targets based on the acquired position, thereby acquiring the number of evacuees for each of the targets.

(1-2) The information processing device 100 selects any of the targets based on the acquired numbers of evacuees for the plurality of targets and the importance levels set for the plurality of targets. For example, the information processing device 100 selects, from among the plurality of targets, a target for which a product of the acquired number of evacuees for the target and an importance level set for the target is the highest.

(1-3) The information processing device 100 associates information on the selected target with information on the acquired number of evacuees for the selected target and outputs the information on the selected target and the information on the acquired number of evacuees for the selected target to the predetermined user. The information on the number of evacuees is, for example, information indicating the number of evacuees. The information on the number of evacuees may be, for example, information indicating the rate of increase in the number of evacuees. For example, the information processing device 100 associates the information on the selected target with the information on the acquired number of evacuees for the selected target, transmits the information on the selected target and the information on the acquired number of evacuees for the selected target to the terminal device 110 corresponding to the predetermined user, and may enable the predetermined user to recognize the information.

Therefore, the information processing device 100 may enable the predetermined user to appropriately determine whether to evacuate. For example, the information processing device 100 may select information to be output, based on the acquired numbers of evacuees for the targets and the importance levels set for the targets, and may enable the predetermined user to appropriately determine whether to evacuate.

For example, the information processing device 100 may treat, as information to be output, information that is included in information on the acquired numbers of evacuees for the targets and has a large effect of prompting the predetermined user to evacuate. For example, the information processing device 100 may treat, on a priority basis as information to be output, the acquired number of evacuees for a target that is among the plurality of targets, and for which a relatively high importance level has been set, and for which an effect of prompting the predetermined user to evacuate is determined to be relatively large. For example, the information processing device 100 may treat, on a priority basis as information to be output, a relatively large number of evacuees for a target that is among the plurality of targets and for which an effect of prompting the predetermined user to evacuate is determined to be relatively large.

As a result, the information processing device 100 may treat, as information to be output, information on the acquired number of evacuees for a target that is among the plurality of targets and for which an effect of prompting the predetermined user to evacuate is comprehensively determined to be the largest based on the numbers of evacuees and the importance levels.

For example, the information processing device 100 may output information to be output so that the predetermined user is able to reference the information. The information processing device 100 may have a positive effect on the predetermined user due to majority synching bias and enable the predetermined user to determine to evacuate. In this case, the information processing device 100 may output only information to be output without having a negative effect on the predetermined user due to majority synching bias and may inhibit the predetermined user from being late to evacuate. As a result, the information processing device 100 may make the predetermined user less susceptible to damage from a disaster.

The information processing device 100 may have a positive effect on the predetermined user due to majority synching bias and enable the predetermined user to evacuate, thereby increasing the number of evacuees. The information processing device 100 may improve an effect of prompting other users to evacuate due to the increase in the number of evacuees. In this manner, the information processing device 100 may have a series of positive effects due to majority synching bias and enable all residents to evacuate. Therefore, the information processing device 100 may suppress the occurrence of damage from disasters.

For example, the information processing device 100 may output information on the acquired number of evacuees for a target that is among the plurality of targets and has a relatively deep relationship with the predetermined user so that the predetermined user is able to reference the information. Therefore, the information processing device 100 may not output information that the predetermined user tends to easily ignore. The information processing device 100 may output information on which the predetermined user easily places importance, and inhibit the predetermined user from being late to evacuate. As a result, the information processing device 100 may make the predetermined user less susceptible to damage from a disaster.

For example, the information processing device 100 may output only information to be output and may inhibit the predetermined user from trusting information that is favorable to the predetermined user for evacuation. As a result, the information processing device 100 may make the predetermined user less susceptible to damage from a disaster.

Although the case where the information processing device 100 counts evacuees for each of the targets, the information processing device 100 is not limited to this. For example, the information processing device 100 may acquire the number of evacuees for any of the targets by receiving the number of evacuees for the target from a counting device for counting evacuees for any of the targets.

Although the case where, as each of the targets becomes closer to the position corresponding to the predetermined user, an effect in which the number of evacuees counted for the target prompts the predetermined user to evacuate becomes larger and the number of evacuees counted for the target is more preferably determined to be referenced by the predetermined user on a priority basis, the targets are not limited to this. For example, as each of the targets becomes farther from the position corresponding to the predetermined user, an effect in which the number of evacuees counted for the target prompts the predetermined user to evacuate may become larger and the number of evacuees counted for the target may be more preferably determined to be referenced by the predetermined user on a priority basis. For example, as each of the targets becomes farther from the position corresponding to the predetermined user, an importance level set for the target becomes larger.

(Example of Evacuation Support System 200)

Next, an example of an evacuation support system 200 that uses the information processing device 100 illustrated in FIG. 1 is described with reference to FIG. 2.

Figure 2:
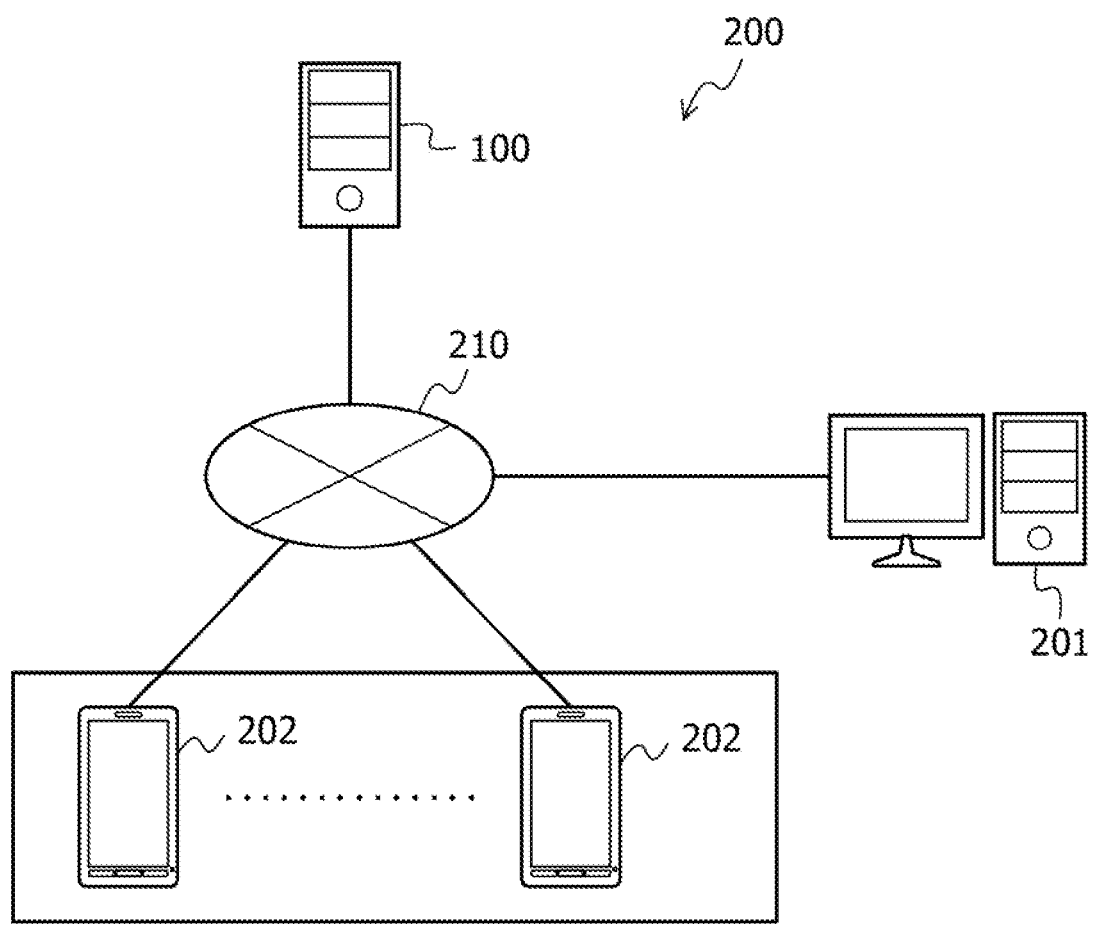
FIG. 2 is an explanatory diagram illustrating an example of an evacuation support system.

FIG. 2 is an explanatory diagram illustrating the example of the evacuation support system 200. In FIG. 2, the evacuation support system 200 includes the information processing device 100, a detecting device 201, and terminal devices 202.

In the evacuation support system 200, the information processing device 100 and the detecting device 201 are coupled to each other via a wired or wireless network 210. The network 210 is, for example, a local area network (LAN), a wide area network (WAN), the Internet, or the like. In the evacuation support system 200, the information processing device 100 and the terminal devices 202 are coupled to each other via the wired or wireless network 210.

The information processing device 100 is used by an operator of the evacuation support system 200. The information processing device 100 acquires, for example, the number of evacuees for each of a plurality of targets corresponding to a predetermined user. For example, the information processing device 100 acquires the number of evacuees for any of the targets by receiving the number of evacuees for the target from the detecting device 201.

For example, the information processing device 100 may receive, from the detecting device 201, the presence or state of a terminal device 202 corresponding to any of users. The information processing device 100 may count evacuees for any of the targets based on the received presence or state of the terminal device 202 corresponding to the user.

For example, the information processing device 100 selects any of the plurality of targets based on the acquired numbers of evacuees for the targets and importance levels set for the targets. For example, the information processing device 100 transmits, to a terminal device 202 corresponding to the predetermined user, information on the acquired number of evacuees for the selected target. The information processing device 100 includes, for example, various tables illustrated in FIGS. 4 to 6 and described later with reference to FIGS. 4 to 6. The information processing device 100 is, for example, a server, a personal computer (PC), or the like.

The detecting device 201 is a computer that may count the number of evacuees for any of the targets. The detecting device 201 detects, for example, the presence or state of a terminal device 202 corresponding to any of the users. The state indicates, for example, a position, a movement, or the like. The detecting device 201 counts, for example, evacuees for any of the targets. The detecting device 201 counts, for example, evacuees for any of the targets based on the detected presence or state of the terminal device 202. The detecting device 201 transmits, for example, the number of evacuees counted for any of the targets to the information processing device 100. For example, the detecting device 201 may transmit the detected presence or state of the terminal device 202 to the information processing device 100, thereby enabling the information processing device 100 to count evacuees for any of the targets. The detecting device 201 is, for example, a server, a PC, an imaging device, a sensor device, or the like.

Each of terminal devices 202 is a computer used by any of the users. Each of the terminal devices 202 receives, from the information processing device 100, information on the number of evacuees for any of the targets and outputs the information so that any of the users who use the terminal devices 202 is able to reference the information. Each of the terminal devices 202 is, for example, a PC, a tablet terminal, a smartphone, a wearable terminal, an artificial intelligence (AI) speaker, an Internet of Things (IoT) device, or the like.

Although the case where the information processing device 100 is different from the detecting device 201 is described above, the information processing device 100 is not limited to this. For example, the information processing device 100 may be integrated with the detecting device 201. Although the case where the information processing device 100 is different from each of the terminal devices 202 is described above, the information processing device 100 is not limited to this. For example, the information processing device 100 may be integrated with the terminal device 202.

(Example of Hardware Configuration of Information Processing Device 100)

Next, an example of a hardware configuration of the information processing device 100 is described with reference to FIG. 3.

Figure 3:
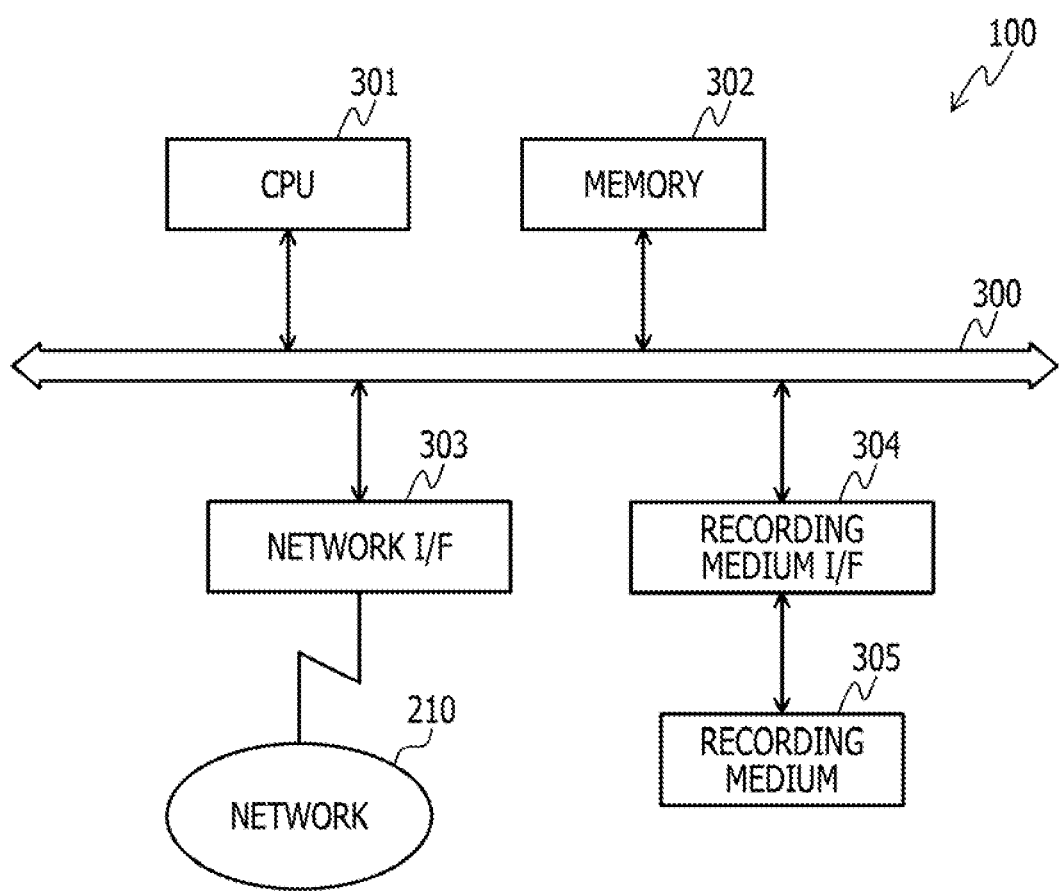
FIG. 3 is a block diagram illustrating an example of a hardware configuration of an information processing device.

FIG. 3 is a block diagram illustrating the example of the hardware configuration of the information processing device 100. In FIG. 3, the information processing device 100 includes a central processing unit (CPU) 301, a memory 302, a network interface (I/F) 303, a recording medium I/F 304, and a recording medium 305. The constituent units are coupled to each other via a bus 300.

The CPU 301 controls the entire information processing device 100. The memory 302 includes, for example, a read-only memory (ROM), a random-access memory (RAM), and a flash ROM. For example, the flash ROM and the ROM store various programs, and the RAM is used as a work area of the CPU 301. The programs stored in the memory 302 are loaded into the CPU 301, thereby causing the CPU 301 to execute a coded process.

The network I/F 303 is coupled to the network 210 via a communication line and coupled to another computer via the network 210. The network IF 303 serves as an interface between the network 210 and the inside of the information processing device 100 and controls input and output of data from and to the other computer. The network I/F 303 is, for example, a modem, a LAN adapter, or the like.

The recording medium I/F 304 controls reading and writing of data from and to the recording medium 305 in accordance with control by the CPU 301. The recording medium I/F 304 is, for example, a disk drive, a solid-state drive (SSD), a Universal Serial Bus (USB) port, or the like. The recording medium 305 is a nonvolatile memory for storing data written in accordance with control by the recording medium I/F 304. The recording medium 305 is, for example, a disk, a semiconductor memory, a USB memory, or the like. The recording medium 305 may be attachable to and detachable from the information processing device 100.

The information processing device 100 may include, for example, a keyboard, a mouse, a display, a printer, a scanner, a microphone, and a speaker, as well as the foregoing constituent units. The information processing device 100 may include a plurality of recording medium I/Fs 304 and a plurality of recording media 305. The information processing device 100 may not include the recording medium I/F 304 and the recording medium 305.

(Details Stored in Evacuation Site Management Table 400)

Next, an example of details stored in an evacuation site management table 400 is described with reference to FIG. 4. The evacuation site management table 400 is, for example, enabled by a storage region of the memory 302 of the information processing device 100 illustrated in FIG. 3, a storage region of the recording medium 305 illustrated in FIG. 3, or the like.

FIG. 4 is an explanatory diagram illustrating the example of the details stored in the evacuation site management table 400. As illustrated in FIG. 4, the evacuation site management table 400 includes fields for evacuation sites, IDs, positions x, positions y, the numbers of evacuees at (t), and the numbers of evacuees at (t-1). In the evacuation site management table 400, evacuation site information is stored as a record 400-$a$ by setting information in each of the fields for each of evacuation sites, a is an arbitrary integer.

In the field for evacuation sites, names identifying the evacuation sites are set. In the field for IDs, IDs identifying the evacuation sites are set. In the field for positions x, x coordinates of x and y coordinates indicating positions of the evacuation sites are set. In the field for positions y, the y coordinates of the x and y coordinates indicating the positions of the evacuation sites are set. In the field for the numbers of evacuees at (t), the numbers of evacuees in the evacuation sites at time t are set. In the field for the numbers of evacuees at (t-1), the numbers of evacuees in the evacuation sites at time t-1 before the time t are set.

(Details Stored in User Information Management Table 500)

Next, an example of details stored in a user information management table 500 is described with reference to FIG. 5. The user information management table 500 is, for example, enabled by a storage region of the memory 302 of the information processing device 100 illustrated in FIG. 3, a storage region of the recording medium 305 illustrated in FIG. 3, or the like.

FIG. 5 is an explanatory diagram illustrating the example of the details stored in the user information management table 500. As illustrated in FIG. 5, the user information management table 500 includes fields for IDs, positions x at (t), positions y at (t), positions x at (t-1), positions y at (t-1), and states. In the user information management table 500, user information is stored as a record 500-$b$ by setting information in each of the fields for each of the users, b is an arbitrary integer.

In the field for IDs, IDs identifying the users are set. In the field for positions x at (t), x coordinates of x and y coordinates indicating positions of the users at the time t are set. In the field for positions y at (t), the y coordinates of the x and y coordinates indicating the positions of the users at the time t are set. In the field for positions x at (t-1), x coordinates of x and y coordinates indicating positions of the users at time t-1 are set. In the field for positions y at (t-1), the y coordinates of the x and y coordinates indicating the positions of the users at the time t-1 are set. In the field for states, information indicating whether the users have evacuated is set. Active indicates that a user has evacuated.

(Details Stored in Peripheral Information Management Table 600)

Next, an example of details stored in a peripheral information management table 600 is described with reference to FIG. 6. The peripheral information management table 600 is, for example, enabled by a storage region of the memory 302 of the information processing device 100 illustrated in FIG. 3, a storage region of the recording medium 305 illustrated in FIG. 3, or the like.

FIG. 6 is an explanatory diagram illustrating the example of the details stored in the peripheral information management table 600. As illustrated in FIG. 6, the peripheral information management table 600 includes fields for evacuee IDs, xx-km range IDs, and yy-km range IDs. In the peripheral information management table 600, peripheral information of each of the users is recorded as a record 600-$c$ by setting information in each of the fields for each of the users, c is an arbitrary integer.

In the field for evacuee IDs, evacuee IDs identifying the users are set. In the field for xx-km range IDs, evacuee IDs identifying evacuees present within ranges that have a radius of xx kilometers and have their centers at the positions of the users are set. In the field for yy-km range IDs, evacuee IDs identifying evacuees present within ranges that have a radius of yy kilometers and have their centers at the positions of the users are set.

(Example of Hardware Configuration of Detecting Device 201)

Next, an example of a hardware configuration of the detecting device 201 included in the evacuation support system 200 illustrated in FIG. 2 is described with reference to FIG. 7.

Figure 7:
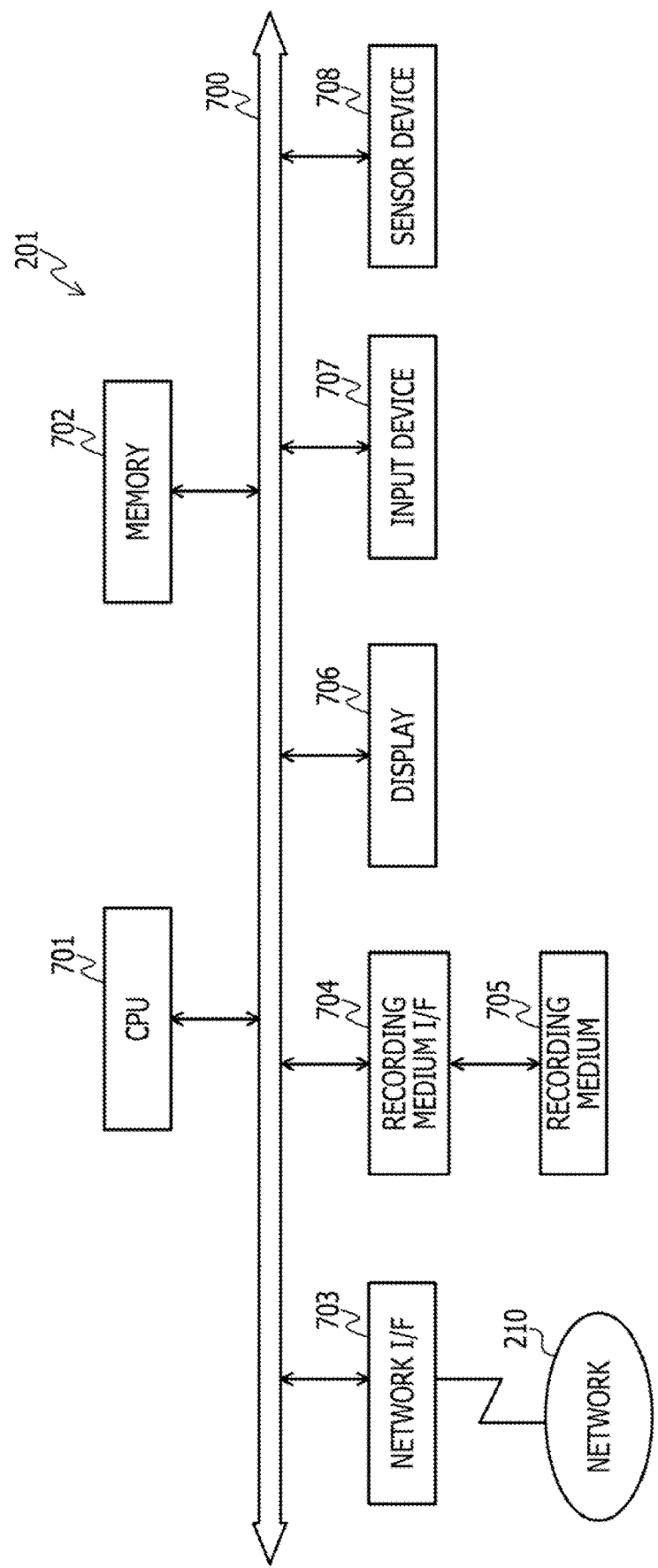
FIG. 7 is a block diagram illustrating an example of a hardware configuration of a detecting device.

FIG. 7 is a block diagram illustrating the example of the hardware configuration of the detecting device 201. In FIG. 7, the detecting device 201 includes a CPU 701, a memory 702, a network I/F 703, a recording medium I/F 704, a recording medium 705, a display 706, an input device 707, and a sensor device 708. The constituent units are coupled to each other via a bus 700.

The CPU 701 controls the entire detecting device 201. The memory 702 includes, for example, a ROM, a RAM, and a flash ROM. For example, the flash ROM and the ROM store various programs, and the RAM is used as a work area of the CPU 701. The programs stored in the memory 702 are loaded into the CPU 701, thereby causing the CPU 701 to execute a coded process.

The network I/F 703 is coupled to the network 210 via a communication line and coupled to another computer via the network 210. The network I/F 703 serves as an interface between the network 210 and the inside of the detecting device 201 and controls input and output of data from and to the other computer. The network I/F 703 is, for example, a modem, a LAN adapter, or the like.

The recording medium I/F 704 controls reading and writing of data from and to the recording medium 705 in accordance with control by the CPU 701. The recording medium I/F 704 is, for example, a disk drive, an SSD, a USB port, or the like. The recording medium 705 is a nonvolatile memory for storing data written in accordance with control by the recording medium I/F 704. The recording medium 705 is, for example, a disk, a semiconductor memory, a USB memory, or the like. The recording medium 705 may be attachable to and detachable from the detecting device 201.

The display 706 displays a cursor, an icon, a tool box, and data, such as a document, an image, and function information. The display 706 is, for example, a cathode ray tube (CRT), a liquid crystal display, an electroluminescence (EL) display, or the like. The input device 707 may include keys for inputting characters, numbers, various instructions, and the like and inputs data. The input device 707 may be a keyboard, a mouse, or the like or may be a touch panel type input pad, a touch panel type numeric keypad, or the like.

The sensor device 708 acquires information indicating an index to count evacuees. The sensor device 708 includes, for example, an imaging device and acquires image information captured by the imaging device. The image information corresponds to a captured image of a site where a user may be imaged. The sensor device 708 may acquire, for example, information indicating the presence or state of a terminal device 202 corresponding to a user who may be an evacuee. The sensor device 708 may acquire, for example, information indicating the presence or state of the terminal device 202 by detecting information of a signal emitted by the terminal device 202.

The detecting device 201 may include, for example, a keyboard, a mouse, a display, a printer, a scanner, a microphone, and a speaker, as well as the foregoing constituent units. The detecting device 201 may include a plurality of recording medium I/Fs 704 and a plurality of recording media 705. The detecting device 201 may not include the recording medium I/F 704 and the recording medium 705.

(Example of Hardware Configurations of Terminal Devices 202)

Next, an example of a hardware configuration of each of the terminal devices 202 included in the evacuation support system 200 illustrated in FIG. 2 is described with reference to FIG. 8.

Figure 8:
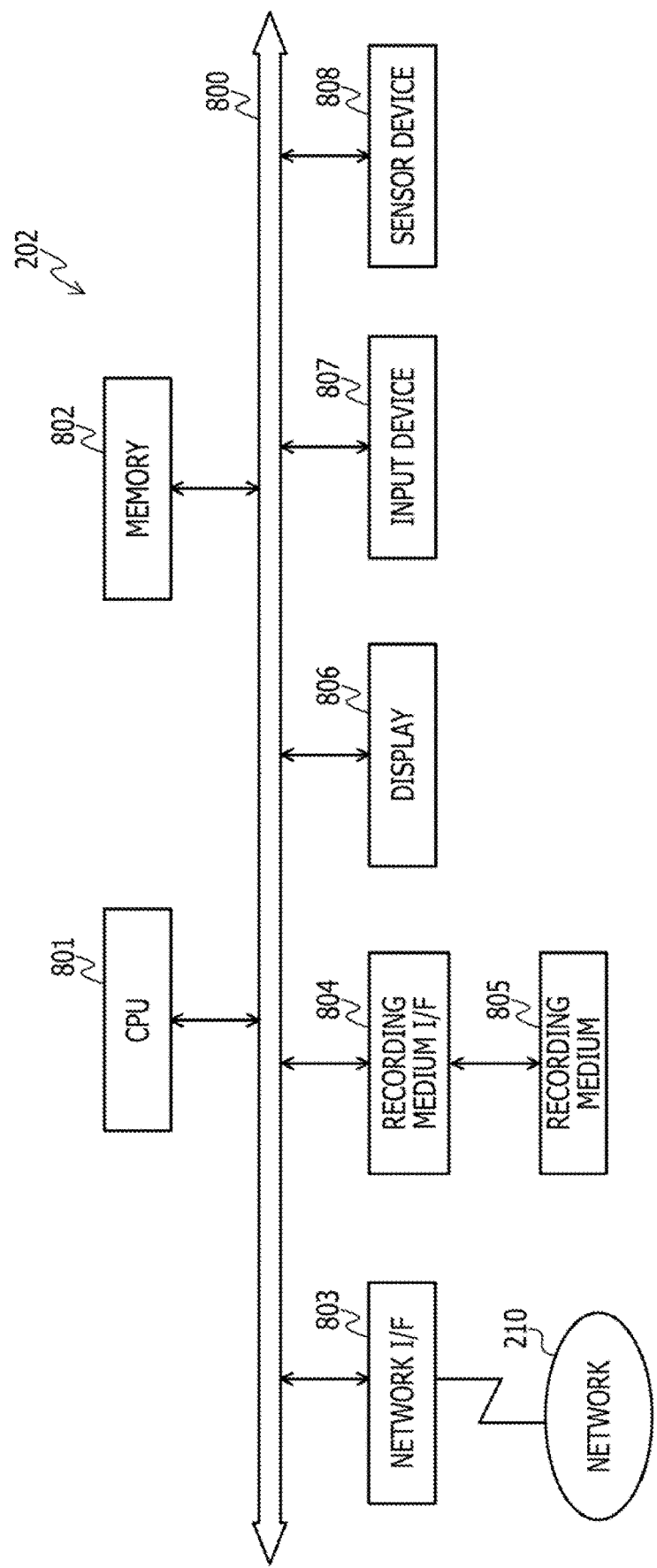
FIG. 8 is a block diagram illustrating an example of a hardware configuration of a terminal device.

FIG. 8 is a block diagram illustrating the example of the hardware configuration of the terminal device 202. In FIG. 8, the terminal device 202 includes a CPU 801, a memory 802, a network I/F 803, a recording medium I/F 804, a recording medium 805, a display 806, an input device 807, and a sensor device 808. The constituent units are coupled to each other via a bus 800.

The CPU 801 controls the entire terminal device 202. The memory 802 includes, for example, a ROM, a RAM, and a flash ROM. For example, the flash ROM and the ROM store various programs, and the RAM is used as a work area of the CPU 801. The programs stored in the memory 802 are loaded into the CPU 801, thereby causing the CPU 801 to execute a coded process.

The network I/F 803 is coupled to the network 210 via a communication line and coupled to another computer via the network 210. The network I/F 803 serves as an interface between the network 210 and the inside of the terminal device 202 and controls input and output of data from and to the other computer. The network I/F 803 is, for example, a modem, a LAN adapter, or the like.

The recording medium I/F 804 controls reading and writing of data from and to the recording medium 805 in accordance with control by the CPU 801. The recording medium I/F 804 is, for example, a disk drive, an SSD, a USB port, or the like. The recording medium 805 is a nonvolatile memory for storing data written in accordance with control by the recording medium I/F 804. The recording medium 805 is, for example, a disk, a semiconductor memory, a USB memory, or the like. The recording medium 805 may be attachable to and detachable from the terminal device 202.

The display 806 displays a cursor, an icon, a tool box, and data, such as a document, an image, and function information. The display 806 is, for example, a cathode ray tube (CRT), a liquid crystal display, an electroluminescence (EL) display, or the like. The input device 807 may include keys for inputting characters, numbers, various instructions, and the like and inputs data. The input device 807 may be a keyboard, a mouse, or the like or may be a touch panel type input pad, a touch panel type numeric keypad, or the like.

The sensor device 808 detects the state of the terminal device 202. The sensor device 808 detects, for example, either one or both of the position of the terminal device 202 and a movement of the terminal device 202. The sensor device 808 includes, for example, an acceleration sensor. The sensor device 808 may include, for example, one or more of a geomagnetic sensor, an optical sensor, a vibration sensor, and the like. The sensor device 808 may include, for example, a Global Positioning System (GPS) receiver and detect GPS coordinates of the terminal device 202. The sensor device 808 may include, for example, an imaging device and acquire image information captured by the imaging device.

The terminal device 202 may include, for example, a printer, a scanner, a microphone, and a speaker, as well as the foregoing constituent units. The terminal device 202 may include a plurality of recording medium I/Fs 804 and a plurality of recording media 805. The terminal device 202 may not include the recording medium I/F 804 and the recording medium 805.

(Example of Functional Configuration of Information Processing Device 100)

Next, an example of a functional configuration of the information processing device 100 is described with reference to FIG. 9.

Figure 9:
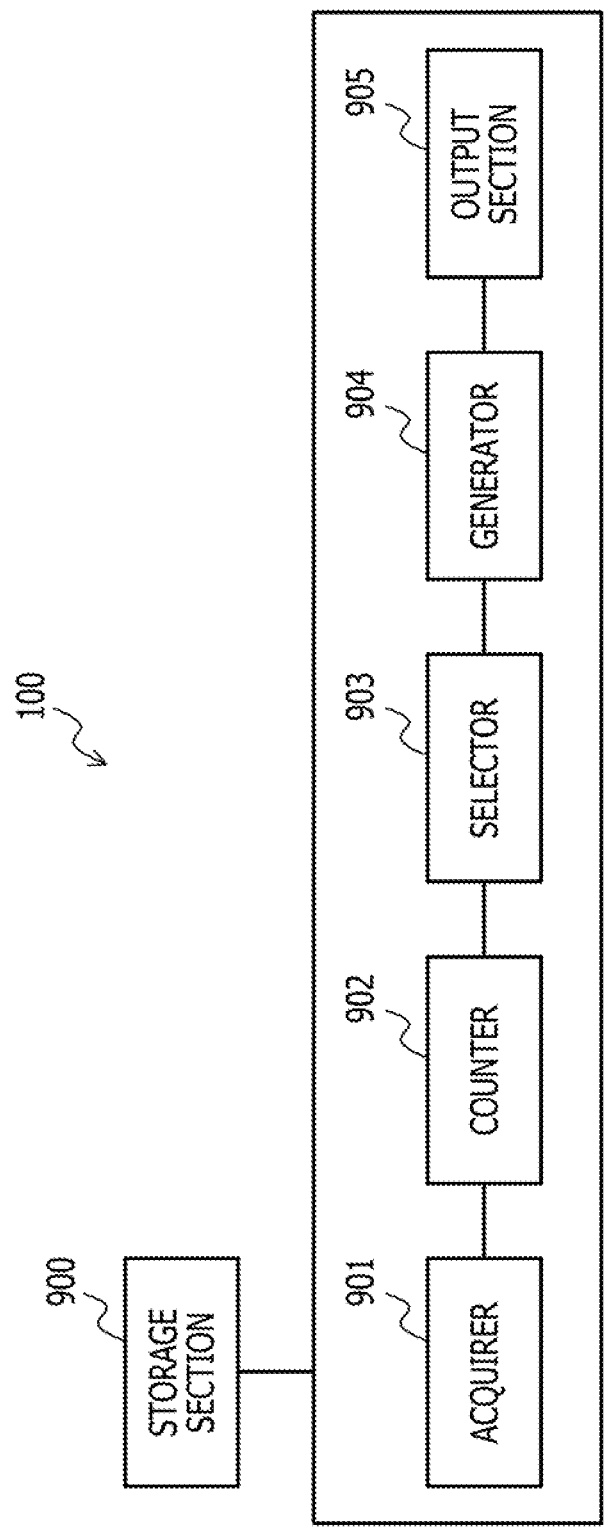
FIG. 9 is a block diagram illustrating an example of a functional configuration of the information processing device.

FIG. 9 is a block diagram illustrating the example of the functional configuration of the information processing device 100. The information processing device 100 includes a storage section 900, an acquirer 901, a counter 902, a selector 903, a generator 904, and an output section 905.

The storage section 900 is, for example, enabled by a storage region of the memory 302 illustrated in FIG. 3, a storage region of the recording medium 305 illustrated in FIG. 3, or the like. Although the case where the storage section 900 is included in the information processing device 100 is described below, the storage section 900 is not limited to this. For example, the storage section 900 may be included in a device different from the information processing device 100, and the information processing device 100 may reference details stored in the storage section 900.

The sections 901 to 905 of the information processing device 100 function as an example of a controller. For example, functions of the sections 901 to 905 are enabled by causing the CPU 301 to execute a program stored in a storage region of the memory 302 illustrated in FIG. 3, a storage region of the recording medium 305 illustrated in FIG. 3, or the like or are enabled by the network I/F 303, Results of processes executed by the functional sections are, for example, stored in a storage region of the memory 302 illustrated in FIG. 3, a storage region of the recording medium 305 illustrated in FIG. 3, or the like.

The storage section 900 is referenced in the processes executed by the functional sections or stores various information to be updated. The storage section 900 stores information on each of the plurality of targets corresponding to the predetermined user. The plurality of targets are, for example, ranges or sites for which evacuees are to be counted. The ranges are physical ranges or logical ranges. The physical ranges are, for example, predetermined sites. The sites are, for example, evacuation destinations. The logical ranges are, for example, user's groups. The user's groups are, for example, a group of relatives, a group including the relatives and friends, a group of including the relatives, the friends, and acquaintances, and the like.

A first target among the plurality of targets is, for example, a predetermined physical range including a position corresponding to the predetermined user. A second target among the plurality of targets is, for example, an evacuation destination that is the closest to the position corresponding to the predetermined user. A third target among the plurality of targets is, for example, a plurality of evacuation destinations present in a first range that is based on the position corresponding to the predetermined user. A fourth target among the plurality of targets is, for example, a plurality of evacuation destinations present in a second range that is larger than the first range and based on the position corresponding to the predetermined user.

The storage section 900 stores, for example, information identifying each of the plurality of targets. The information identifying the targets is, for example, names or IDs that identify the targets. The storage section 900 stores, for example, information identifying each of positions of the plurality of targets. The information identifying the positions is, for example, coordinates identifying the position of each of one or more evacuation destinations forming each of the targets. For example, the storage section 900 causes the information identifying each of the plurality of targets and the information identifying each of the positions of the plurality of targets to be stored in the evacuation site management table 400.

For example, the storage section 900 stores methods for counting evacuees for the plurality of targets. The counting methods are based on characteristics of the targets. The counting methods include, for example, information indicating definitions of users who are treated as evacuees. The methods for counting evacuees for the targets may be the same. A method for counting evacuees for any of the plurality of targets may be different from a method for counting evacuees for another one of the plurality of targets.

The storage section 900 stores, for example, the importance levels set for the plurality of targets. Each of the importance levels is, for example, an index value indicating how effective it is to prompt the predetermined user to evacuate when the number of evacuees counted for a target for which the importance level is set is referenced by the predetermined user. The importance levels are, for example, index values corresponding to the depths of the relationships between the targets and the predetermined user. For example, a relatively large importance level is set for a target that is among the plurality of targets and has a relatively deep relationship with the predetermined user. The relationships are physical or psychological relationships.

For example, the importance levels are set for the targets based on positional relationships between the position corresponding to the predetermined user and sites corresponding to the targets. For example, each of the importance levels for the targets is set according to a standard that the value of the Importance level becomes larger as a distance between the position corresponding to the predetermined user and a site corresponding to a target for which the importance level is set becomes shorter. The distance is, for example, a distance between the position corresponding to the predetermined user and the position of the center of the site corresponding to the target. The distance is, for example, a distance between the position corresponding to the predetermined user and the position of a point that is within the site corresponding to the target and is the closest from the predetermined user.

For example, it is considered that, when the targets are logical ranges, each of the importance levels for the targets is set according to a standard that the value of the importance level becomes larger as the average of levels of intimacies between the predetermined user and persons present in a target for which the importance level is set becomes higher. For example, it is considered that, when the targets are a group including relatives, a group including the relatives and friends, and a group including the relatives, the friends, and acquaintances, an importance level set for the group including the relatives is relatively large.

For example, it is considered that each of the importance levels for the targets is set according to a standard that the value of the importance level becomes larger as the number of persons present in a target for which the importance level is set becomes larger. For example, it is considered that, when the targets are a croup of 10 persons and a group of 100 persons, an importance level for the group of 100 persons is relatively large. For example, it is considered that each of the importance levels for the targets is set according to a combination of the foregoing standards.

The storage section 900 stores, for example, the number of evacuees counted for each of the plurality of targets. For example, the storage section 900 causes the number of evacuees counted for each of the plurality of targets to be stored in the evacuation site management table 400. For example, the storage section 900 may cause the number of evacuees counted for each of the plurality of targets at the time t and the number of evacuees counted for each of the plurality of targets at the time t-1 to be stored in the evacuation site management table 400.

The storage section 900 stores information on the users. The storage section 900 stores, for example, information identifying the positions of the users. The information identifying the positions of the users indicates, for example, coordinates identifying the positions of the users. The storage section 900 stores, for example, information indicating whether the users are evacuees. For example, the storage section 900 causes, for each of the users, information identifying the position of the user and information indicating whether the user is an evacuee to be stored in the user information management table 500.

The storage section 900 stores, for example, user IDs identifying evacuees present in a predetermined physical range including the position corresponding to the predetermined user. For example, the storage section 900 causes user IDs identifying evacuees present in a physical range that has a radius of xx kilometers and is based on the position corresponding to the predetermined user to be stored in the peripheral information management table 600. For example, the storage section 900 causes user IDs identifying evacuees present in a physical range that has a radius of yy kilometers and is based on the position corresponding to the predetermined user to be stored in the peripheral information management table 600.

The acquirer 901 acquires various information to be used for processes by the functional sections. The acquirer 901 causes the acquired various information to be stored in the storage section 900 or outputs the acquired various information to the functional sections. The acquirer 901 may cause the various information stored in the storage section 900 to be output to the functional sections. The acquirer 901 acquires, for example, the various information based on operation input performed by the operator. The acquirer 901 may receive, for example, the various information from a device different from the information processing device 100.

The acquirer 901 acquires, for example, information identifying positions corresponding to the users. The foregoing positions are, for example, the positions of the terminal devices 202 corresponding to the users. The foregoing positions are, for example, detected by the sensor devices 808 of the terminal devices 202 or by the sensor device 708 of the detecting device 201. The acquirer 901 acquires, for example, information identifying the positions of the terminal devices 202 corresponding to the users by receiving the information from the terminal devices 202. The acquirer 901 acquires, for example, the information identifying the positions of the terminal devices 202 corresponding to the users by receiving the information from the detecting device 201.

The acquirer 901 acquires, for example, the number of evacuees for any of the targets. The acquirer 901 acquires, for example, the number of evacuees for any of the targets by receiving the number of evacuees for the target from the detecting device 201. The acquirer 901 may acquire, for example, an importance level for any of the targets. The acquirer 901 acquires, for example, an importance level for any of the targets by receiving the input of the importance level for the target and sets the importance level for the target.

The acquirer 901 acquires, for example, an image captured by a predetermined imaging device from the predetermined imaging device. The predetermined imaging device is, for example, the detecting device 201. The predetermined imaging device is, for example, enabled by the sensor device 708. The predetermined imaging device is, for example, installed in a site corresponding to any of the targets. For example, when any of the targets is an evacuation destination, the acquirer 901 acquires, for example, an image captured by imaging the evacuation destination by receiving the image from the predetermined imaging device.

The acquirer 901 may acquire, for example, a result of analyzing the image captured by the predetermined imaging device. For example, when any of the targets is an evacuation destination, the acquirer 901 may acquire a result of analyzing how many evacuees are present in an image captured by imaging the evacuation destination. Therefore, the acquirer 901 may acquire information indicating an index to count evacuees for any of the targets.

For example, the predetermined imaging device may be installed in a site not corresponding to a specific target. In this case, for example, the acquirer 901 may acquire, from the predetermined imaging device, an image captured by the predetermined imaging device as information identifying the position of a user.

For example, the acquirer 901 may acquire, from the predetermined imaging device, a result of analyzing the image captured by the predetermined imaging device as information identifying the position of the user. For example, when any of the targets is an evacuation destination, the acquirer 901 may acquire, from the predetermined imaging device, a result of analyzing who is present in an image captured by imaging the evacuation destination as information identifying the position of the user. Therefore, the acquirer 901 may identify the position of a user.

For example, the acquirer 901 acquires, from a predetermined communication device, data acquired by the predetermined communication device and communicated by the terminal devices 202. The predetermined communication device is, for example, the detecting device 201. The predetermined communication device is, for example, enabled by the sensor device 708. The predetermined communication device is, for example, installed in a site corresponding to any of the targets. For example, when any of the targets is an evacuation destination, the acquirer 901 acquires packets captured by the predetermined communication device in the evacuation destination and communicated by the terminal devices 202 by receiving the packets from the predetermined communication device.

For example, the acquirer 901 may acquire, from the predetermined communication device, a result of counting terminal devices 202 in any of the targets based on data acquired by the predetermined communication device and communicated by the terminal devices 202. For example, when any of the targets is an evacuation destination, the acquirer 901 may acquire a result of counting terminal devices 202 in the evacuation destination by receiving the result from the predetermined communication device. Therefore, the acquirer 901 may acquire information indicating an index to count evacuees for any of the targets.

For example, the predetermined communication device may be installed in a site not corresponding to a specific target. In this case, for example, the acquirer 901 may acquire, from the predetermined communication device, data acquired by the predetermined communication device and communicated by the terminal devices 202 as information identifying the positions of the users.

For example, the acquirer 901 may acquire, from the predetermined communication device, a result of analyzing whether any of the terminal devices 202 is present in any of the targets based on data acquired by the predetermined communication device and communicated by the terminal devices 202. For example, when any of the targets is an evacuation destination, the acquirer 901 may acquire a result of analyzing whether any of the terminal devices 202 is present in the evacuation destination by receiving the result from the predetermined communication device. Therefore, the acquirer 901 may identify the position of a user.

For example, the acquirer 901 receives, from a terminal device 202, a notification indicating that a user corresponding to the terminal device 202 is an evacuee for any of the targets. The notification includes information indicating that the user is an evacuee for any of the targets. For example, the terminal device 202 transmits, to the acquirer 901, the notification indicating that the user corresponding to the terminal device 202 is an evacuee for any of the targets, based on operation input performed by the user. The terminal device 202 transmits, for example, the notification to the acquirer 901 in response to clicking of an evacuation completion button displayed on the display 806. Therefore, the acquirer 901 may acquire information indicating an index to count evacuees for any of the targets.

The acquirer 901 may receive a start trigger for starting a process of any of the functional sections. For example, the start trigger occurs when predetermined operation input is performed by the operator. For example, the start trigger may occur when the acquirer 901 receives predetermined information from another computer. For example, the start trigger may occur when any of the functional sections outputs predetermined information. The start trigger may automatically occur at fixed time intervals.

The counter 902 acquires the number of evacuees for any of the targets. The counter 902 acquires, for example, the number of evacuees for any of the targets by counting evacuees for the target. For example, the counter 902 determines whether each of the users corresponding to the plurality of terminal devices 202 is an evacuee for any of the plurality of targets, based on the positions of the terminal devices 202 that have been detected at different time points. The counter 902 counts, for example, evacuees for any of the targets based on results of the determination. Therefore, the counter 902 may detect a user who is evacuating for any of the targets, and may treat the detected user as an evacuee.

The counter 902 acquires, for example, the number of evacuees for any of the targets based on a result of analyzing an image captured by a predetermined imaging device. The imaging device is, for example, the detecting device 201. The imaging device is, for example, enabled by the sensor device 708. For example, when any of the targets is an evacuation destination, the counter 902 acquires the number of evacuees for the target based on a result of analyzing how many evacuees are present in an image captured by imaging the evacuation destination. Therefore, the counter 902 may detect a user who has completely evacuated for any of the targets, and may treat the detected user as an evacuee.

The counter 902 acquires the number of evacuees for any of the targets based on a result of analyzing data acquired by a predetermined communication device and communicated by each of the plurality of terminal devices 202. The communication device is, for example, the detecting device 201. The communication device is, for example, enabled by the sensor device 708. For example, when the detecting device 201 is installed in any of the targets, the counter 902 acquires the number of terminal devices 202 for the target as the number of evacuees for the target based on packets of the terminal devices 202 that have been captured by the detecting device 201. Therefore, the counter 902 may detect a user who has completely evacuated for any of the targets, and may treat the detected user as an evacuee.

The counter 902 acquires the number of evacuees for any of the targets based on a notification received from each of the plurality of terminal devices 202 and indicating that a user corresponding to the terminal device 202 is an evacuee for any of the targets. Therefore, the counter 902 may detect a user who has completely evacuated for any of the targets, and may treat the detected user as an evacuee.

The counter 902 calculates the rate of increase in the number of evacuees for any of the targets. The counter 902 calculates, for example, the rate of increase in the number of evacuees for any of the targets based on the numbers of evacuees that have been acquired for the target at different time points. For example, the counter 902 calculates, for any of the targets, the rate of increase in the number of evacuees from the number of evacuees at the time t-1 to the number of evacuees at the time t. Therefore, the counter 902 may acquire information indicating an index to select any of the plurality of targets.

The selector 903 selects any of the targets based on the acquired numbers of evacuees for the targets and the importance levels set for the plurality of targets. For example, the selector 903 selects any of the plurality of targets such that the target is more easily selected from among the plurality of targets as the acquired number of evacuees for the target becomes larger and that the target is more easily selected as the value of the importance level set for the target becomes larger.

For example, the selector 903 selects, from among the plurality of targets, a target for which the sum of the number of evacuees and an importance level is the largest. For example, the selector 903 may select, from among the plurality of targets, a target for which a weighted sum of the number of evacuees and an importance level is the largest. For example, the selector 903 may select, from among the plurality of targets, a target for which the product of the number of evacuees and an importance level is the largest. For example, the selector 903 may select, from among the plurality of targets, a target for which a weighted product of the number of evacuees and an importance level is the largest.

Therefore, the selector 903 may determine whether information on the number of evacuees for any of the targets is to be output to the predetermined user. The information on the number of evacuees is, for example, the number of evacuees. For example, the information on the number of evacuees may be the rate of increase in the number of evacuees. For example, the information on the number of evacuees may be a risk level corresponding to the number of evacuees. In this case, the selector 903 may determine whether the information on the number of evacuees for any of the targets is to be output to the predetermined user so that an effect of prompting the predetermined user to evacuate is improved.

The selector 903 may select any of the plurality of targets based on the rate, calculated for each of the targets, of increase in the number of evacuees and the importance levels set for the targets. For example, the selector 903 selects any of the plurality of targets such that the target is more easily selected from among the plurality of targets as the calculated rate of increase in the number of evacuees becomes higher and that the target is more easily selected as the value of the importance level set for the target becomes larger.

For example, the selector 903 selects, from among the plurality of targets, a target for which the sum of the rate of increase in the number of evacuees and an importance level is the largest. For example, the selector 903 may select, from among the plurality of targets, a target for which a weighted sum of the rate of increase in the number of evacuees and an importance level is the largest. For example, the selector 903 may select, from among the plurality of targets, a target for which the product of the rate of increase in the number of evacuees and an importance level is the largest. For example, the selector 903 may select, from among the plurality of targets, a target for which a weighted product of the rate of increase in the number of evacuees and an importance level is the largest.

Therefore, the selector 903 may determine whether information on the number of evacuees for any of the targets is to be output to the predetermined user. In this case, the selector 903 may determine whether the information on the number of evacuees for any of the targets is to be output to the predetermined user so that an effect prompting the predetermined user to evacuate is improved.

The selector 903 may select only one of the plurality of targets. Therefore, the selector 903 may not treat, as information to be output to the predetermined user, information on the number of evacuees for any target for which an effect of prompting the predetermined user to evacuate is relatively small. Therefore, the selector 903 may effectively prompt the predetermined user to evacuate.

The selector 903 may not select any of the targets when all the acquired numbers of evacuees for the targets are smaller than a threshold. Therefore, the selector 903 may not treat, as information to be output, information on the numbers of evacuees for the targets when an effect of prompting the predetermined user to evacuate is determined to be relatively small or an effect of suppressing evacuation of the predetermined user is determined to be relatively large. Therefore, the selector 903 may effectively prompt the predetermined user to evacuate.

The selector 903 may not select any of the targets when all the rates, calculated for the targets, of increase in the numbers of evacuees are lower than a threshold. Therefore, the selector 903 may not treat, as information to be output, information on the numbers of evacuees for the targets when an effect of prompting the predetermined user to evacuate is determined to be relatively small or an effect of suppressing evacuation of the predetermined user is determined to be relatively large. Therefore, the selector 903 may effectively prompt the predetermined user to evacuate.

The generator 904 generates output information that is to be output to the predetermined user and in which information on a target selected from among the targets is associated with information on the acquired number of evacuees for the selected target. Therefore, the generator 904 may generate the output information to be output by the output section 905.

The generator 904 may generate the output information when the acquired number of evacuees for the selected target is equal to or larger than a threshold. In this case, the generator 904 does not generate the output information when the acquired number of evacuees for the selected target is smaller than the threshold. Therefore, the generator 904 may not output information on the number of evacuees for any of the targets when an effect of prompting the predetermined user to evacuate is determined to be relatively small or when an effect of suppressing evacuation of the predetermined user is determined to be relatively large. Therefore, the generator 904 may effectively prompt the predetermined user to evacuate.

The generator 904 may generate the output information when the rate, calculated for the selected target, of increase in the number of evacuees is equal to or higher than a threshold. The generator 904 does not generate the output information when the rate, calculated for the selected target, of increase in the number of evacuees is lower than the threshold. Therefore, the generator 904 may not output information on the number of evacuees for any of the targets when an effect of prompting the predetermined user to evacuate is determined to be relatively small or when an effect of suppressing evacuation of the predetermined user is determined to be relatively large. Therefore, the generator 904 may effectively prompt the predetermined user to evacuate.

The generator 904 generates only output information that is to be output to the predetermined user and in which information on one of targets selected from among the plurality of targets is associated with information on the acquired number of evacuees for the one of the selected targets. The generator 904 does not generate output information that is to be output to the predetermined user and relates to the acquired number of evacuees for a remaining target that is among the plurality of targets and is not the selected one target. Therefore, the generator 904 may effectively prompt the predetermined user to evacuate without generating information that is to be output to the predetermined user and relates to the number of evacuees for any target for which an effect of prompting the predetermined user to evacuate is relatively small.

The output section 905 outputs a process result of any of the functional sections. The process result is output by displaying the process result on a display, outputting the process result to a printer and printing the process result, transmitting the process result by the network I/F 303 to an external device, or storing the process result in a storage region, such as the memory 302 or the recording medium 305. Therefore, the output section 905 may notify a process result of any of the functional sections to the operator and improve the convenience of the information processing device 100.

The output section 905 outputs, for example, the output information generated by the generator 904. The output section 905 transmits, for example, the output information generated by the generator 904 to the terminal device 202. Therefore, the output section 905 may effectively prompt the predetermined user to evacuate.

(Operation Procedure of Evacuation Support System 200)

Next, an operation procedure of the evacuation support system 200 is described with reference to FIG. 10.

Figure 10:
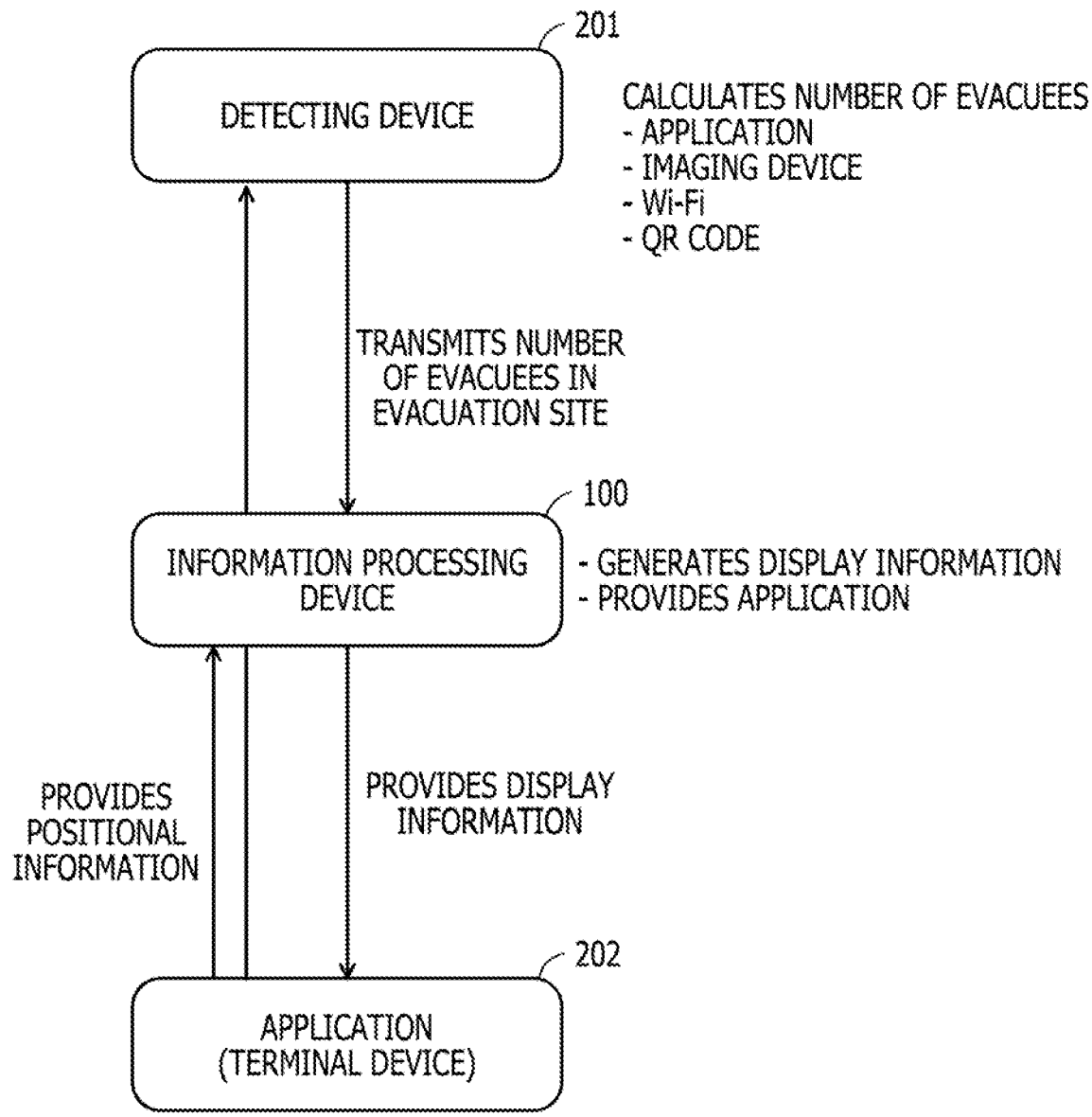
FIG. 10 is an explanatory diagram illustrating an operation procedure of the evacuation support system.

FIG. 10 is an explanatory diagram illustrating the operation procedure of the evacuation support system 200. In FIG. 10, the detecting device 201 calculates the number of evacuees for one or multiple evacuation sites or for a predetermined range at predetermined time intervals and transmits the calculated number of evacuees to the information processing device 100. The predetermined range is, for example, a range that has a radius of x meters and has its center at the current position of the predetermined user. The predetermined time intervals are, for example, fixed time intervals.

For example, it is considered that each of the terminal devices 202 has an application via which information indicating an evacuation status of a user who uses the terminal device 202 may be input to the terminal device 202. The information indicating the evacuation status includes, for example, information indicating that the user is not evacuating, or is evacuating, or has completely evacuated. When the user is evacuating, the information indicating the evacuation status includes, for example, information indicating an evacuation site toward which the user moves. When the user has completely evacuated, the information indicating the evacuation status includes, for example, information indicating an evacuation site in which the user is present.

In this case, each of the terminal devices 202 acquires information indicating an evacuation status of a user who uses the terminal device 202, based on operation input to the application by the user who uses the terminal device 202, and transmits the acquired information to the detecting device 201. The detecting device 201 receives, from the terminal devices 202, the information indicating the evacuation statuses of the users who use the terminal devices 202. The detecting device 201 calculates the number of evacuees for an evacuation site corresponding to the detecting device 201 based on the information indicating the evacuation statuses of the users who use the terminal devices 202, and transmits the calculated number of evacuees to the information processing device 100. The evacuation site corresponding to the detecting device 201 may be, for example, a plurality of evacuation sites.

For example, it is considered that the detecting device 201 includes, as the sensor device 708, an imaging device installed in a predetermined evacuation site and able to image the predetermined evacuation site. The detecting device 201 may not be installed in the predetermined evacuation site and may be able to communicate with an imaging device installed in the predetermined evacuation site.

In this case, the detecting device 201 calculates the number of evacuees for the predetermined evacuation site by analyzing an image captured by imaging the evacuation site and transmits the calculated number of evacuees to the information processing device 100. The detecting device 201 calculates, for example, the number of evacuees for the predetermined evacuation site by using an AI-enabled face recognition technique to analyze how many persons are present in the image captured by imaging the predetermined evacuation site, and transmits the calculated number of evacuees to the information processing device 100.

For example, it is considered that the detecting device 201 includes, as the sensor device 708, a communication device installed in the predetermined evacuation site and able to execute Wi-Fi (registered trademark) communication with the terminal devices 202. The communication device is, for example, a relay device that relays data between the terminal devices 202 and the Internet.

In this case, the detecting device 201 detects terminal devices 202 coupled to the communication device. The detecting device 201 may acquire information on users who use the detected terminal devices 202. The detecting device 201 calculates the number of terminal devices 202 detected by the detecting device 201 as the number of evacuees for the predetermined evacuation site and transmits the calculated number of terminal devices 202 to the information processing device 100.

For example, it is considered that a Quick Response (QR) code (registered trademark) that describes information identifying the predetermined evacuation site is set in the predetermined evacuation site and that each of the terminal devices 202 includes, as the sensor device 808, a reading device that reads the QR code set in the predetermined evacuation site.

In this case, after reading the QR code, each of the terminal devices 202 transmits the information identifying the predetermined evacuation site and described in the QR code to the detecting device 201. In this case, each of the terminal devices 202 may transmit, to the detecting device 201, information on a user who uses the terminal device 202 and the foregoing information indicating the predetermined evacuation site. The detecting device 201 receives the information identifying the predetermined evacuation site from the terminal devices 202. The detecting device 201 calculates, based on the received information identifying the predetermined evacuation site, the number of evacuees for the predetermined evacuation site and transmits the calculated number of evacuees to the information processing device 100.

For example, it is considered that the detecting device 201 acquires the positions of the terminal devices 202. The positions of the terminal devices 202 are, for example, GPS coordinates of the terminal devices 202 that have been detected by the GPS receivers included in the terminal devices 202 and serving as the sensor devices 808. The terminal devices 202 transmit information indicating the positions of the terminal devices 202 to the detecting device 20L For example, the information indicating the positions of the terminal devices 202 may be transmitted from a device, such as a ticket machine, a vending machine, or a cash register, to the detecting device 201 when the device communicates with the terminal devices 202.

In this case, the detecting device 201 calculates, for each of the users who use the terminal devices 202, the number of evacuees present in a range that has a radius of x meters and has its center at the current position of the user who uses the terminal device 202, based on the positions of the terminal devices 202. The detecting device 201 transmits the calculated numbers of evacuees to the information processing device 100. A specific example in which the number of evacuees present in a range that has a radius of x meters and has its center at the current position of a user is described later with reference to, for example, FIG. 13.

For example, the detecting device 201 may be installed in the predetermined evacuation site and may directly receive the number of evacuees for the predetermined evacuation site due to operation input performed by an administrator of the predetermined evacuation site.

For example, the information processing device 100 may acquire the positions of the terminal devices 202. In this case, the information processing device 100 calculates, for each of the users who use the terminal devices 202, the number of evacuees present in a range that has a radius of x meters and has its center at the current position of the user, based on the positions of the terminal devices 202.

The information processing device 100 communicates with detecting devices 201 and acquires the number of evacuees for each of the plurality of targets corresponding to the predetermined user. One of the targets is, for example, a range that has a radius of x meters and has its center at the current position of the predetermined user. One of the targets is, for example, an evacuation site that is the closest to the predetermined user. One of the targets is, for example, one or more evacuation sites present in a town including the current position of the predetermined user. One of the targets is, for example, one or more evacuation sites present in a city including the current position of the predetermined user.

The information processing device 100 selects information that is determined to suppress a negative effect of majority synching bias and have a positive effect on the predetermined user and relates to the number of evacuees for any of the targets. For example, the information processing device 100 selects, from among the plurality of targets, a target for which the number of evacuees is the largest. The information processing device 100 generates, as display information, information identifying the selected target and information on the number of evacuees for the selected target, and transmits the generated display information to the terminal device 202. For example, the information processing device 100 transmits the display information to the application included in the terminal device 202. The terminal device 202 displays the received display information on, for example, a display screen of the application in the display 806.

The information processing device 100 may calculate, for example, the rate of increase in the number of evacuees for each of the targets. The information processing device 100 selects, from among the targets, a target for which the rate of increase in the number of evacuees is the highest. The information processing device 100 generates, as display information, information identifying the selected target and information on the number of evacuees for the selected target, and transmits the generated display information to the terminal device 202. A specific example of the generation of the display information is described later with reference to, for example, FIG. 11. Therefore, the information processing device 100 may enable the predetermined user to appropriately determine whether to evacuate.

(Example of Operations of Evacuation Support System 200)

Next, an example of operations of the evacuation support system 200 is described with reference to FIGS. 11 to 14.

Figure 11:
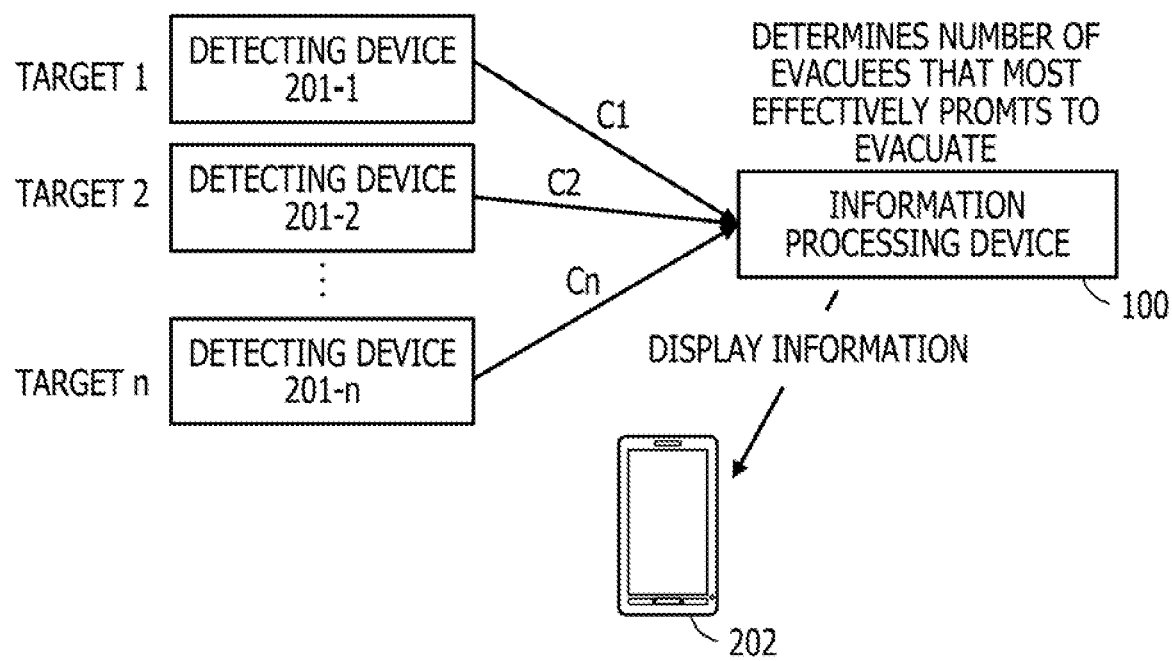
FIG. 11 is a first explanatory diagram illustrating an example of operations of the evacuation support system.

FIGS. 11 to 14 are explanatory diagrams illustrating the example of the operations of the evacuation support system 200. In FIG. 11, detecting devices 201-$i$ ($i$=1, 2, 3, . . . , or n) periodically calculate the numbers $C_i$ of evacuees for targets $i$ and transmits the calculated numbers $C_i$ of evacuees to the information processing device 100, n is a natural number. The following describes the case where n=4. A specific example in which the detecting devices 201-$i$ calculate the numbers of evacuees is described later with reference to, for example, FIGS. 12 and 13.

A target 1 is, for example, a range that has a radius of x meters and has its center at the current position of the user. A target 2 is, for example, an evacuation site that is the closest to the user. A target 3 is, for example, one or more evacuation sites present in a town including the current position of the user. A target 4 is, for example, one or more evacuation sites present in a city including the current position of the user.

The number C1 of evacuees is, for example, the number of evacuees within the range that serves as the target 1, has the radius of x meters, and has its center at the position of the user. The number C2 of evacuees is, for example, the number of evacuees in evacuation sites that serve as the target 2 and are the closest to the user. The number C3 of evacuees is, for example, the total number of evacuees in the one or more evacuation sites that serve as the target 3 and are present in the town including the current position of the user. The number C4 of evacuees is, for example, the total number of evacuees in the one or more evacuation sites that serve as the target 4 and are present in the city including the current position of the user.

The information processing device 100 receives, from each of the detecting devices 201-$i$, the number $C_i$ of evacuees for each of the targets $i$. The information processing device 100 calculates a score $W_i \times C_i$ for each of the targets $i$. $W_i$ indicates an importance level for the target $i$. The importance level $W_i = 1.0/C_{imax} + b_i$. $C_{imax}$ is the maximum value of the number of persons that may be present in the target $i$, $b_i$ is a coefficient set for the target $i$ based on the area of the target $i$ or the area of a region that is based on the position of the user and includes the target $i$. When the target $i$ is one or more evacuation sites, the area of a region including the target $i$ is the area of a region that is based on the position of the user and includes the position of an evacuation site that is the farthest from the user among the one or more evacuation sites, $b_i$ may be a coefficient set based on a distance between a position based on the user and the target $i$. When the target $i$ is a plurality of evacuation sites, a distance to the target $i$ is a distance between the position based on the user and an evacuation site that is the farthest from the user among the plurality of evacuation sites, $b_i = 10/L_{nmax}$. $L_{nmax}$ is the area of the target $i$, the area of a region that is based on the position of the user and includes the target $i$, a distance between the position based on the user and the target $i$, or the like. The information processing device 100 selects, as display information, the number $C_i$ of evacuees for the target $i$ for which the maximum score $W_i \times C_i$ is calculated.

For example, the following case is considered. A target A is a range that has a radius of 10 [km^2] and has its center at the position of the user, 100 persons and 30 evacuees are present in the target A, a target B is a range that has a radius of 200 [km^2] and has its center at the position of the user, and 1000 persons and 300 evacuees are present in the target B. In this case, the information processing device 100 calculates (1.0/100+10/10)*30=30.3 as a score of the target A and calculates (1.0/1000+10/200)*300=15.3 as a score of the target B. The information processing device 100 selects, as display information, 30 persons that are the number of evacuees for the target A for which the maximum score is calculated.

In the example illustrated in FIG. 11, for example, the information processing device 100 selects, as display information, the number C1 of evacuees for the target 1. The information processing device 100 transmits the number C1, selected as the display information, of evacuees for the target 1 to the terminal device 202. The terminal device 202 receives the number C1 of evacuees for the target 1. The terminal device 202 displays the number C1 of evacuees for the target 1 on the display 806. A specific example of details displayed by the terminal device 202 is described later with reference to, for example, FIG. 14. Refer to the description of FIG. 12.

Figure 12:
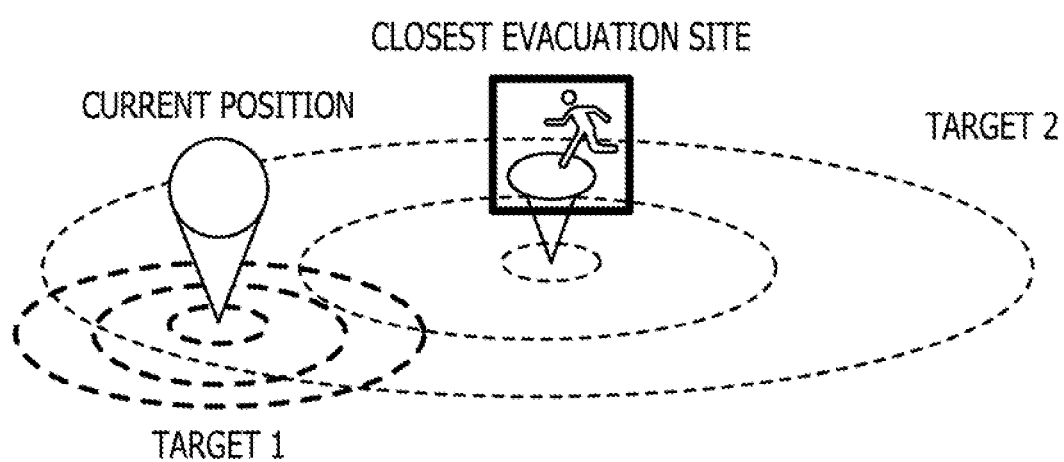
FIG. 12 is a second explanatory diagram Illustrating the example of the operations of the evacuation support system.

In FIG. 12, each of the detecting devices 201-$i$ determines whether each of users included in each of the targets $i$ is an evacuee. For example, a detecting device 201-1 determines whether each of users included in the range that serves as the target 1, has the radius of x kilometers, and has its center at the position of the predetermined user is an evacuee for any evacuation site. The detecting device 201-1 counts how many evacuees are present in the range. In this manner, the detecting device 201-1 calculates the number of evacuees for the target 1.

For example, a detecting device 201-2 determines whether each of users included in a range that has a radius of y kilometers and has its center at the position of the evacuation site that serves as the target 2 and is the closest to the predetermined user is an evacuee for the evacuation site that is the closest to the predetermined user. The detecting device 201-2 counts how many evacuees are present in the range. In this manner, the detecting device 201-2 calculates the number of evacuees for the target 2. The detecting device 201-3 calculates the number of evacuees for the target 3 in the same manner as described above. The detecting device 201-4 calculates the number of evacuees for the target 4 in the same manner as described above. Refer to the description of FIG. 13. A specific example in which each of the detecting devices 201-$i$ determines whether each of users is an evacuee is described below.

Figure 13:
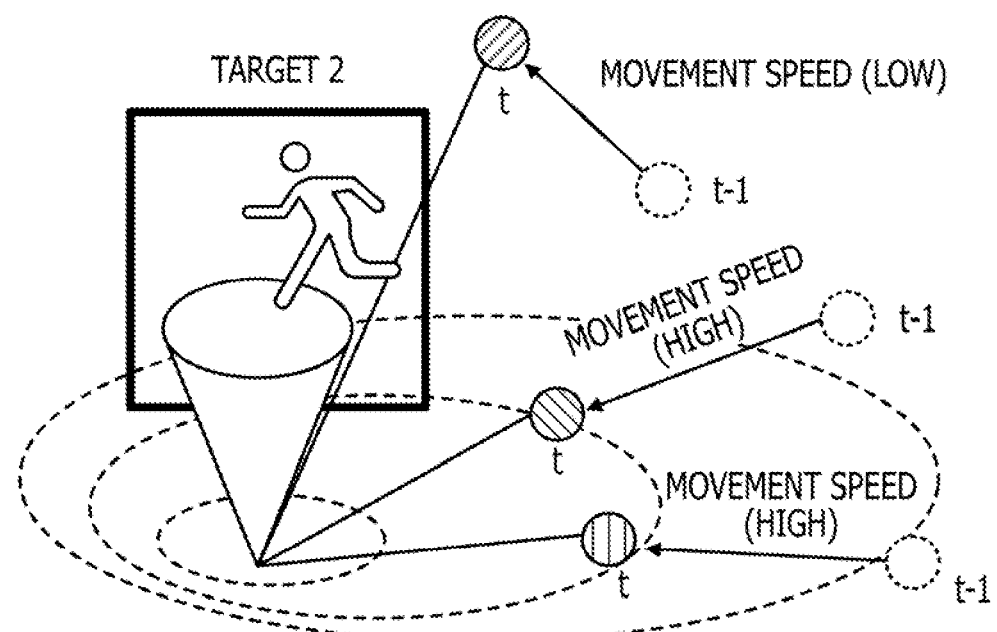
FIG. 13 is a third explanatory diagram illustrating the example of the operations of the evacuation support system.

As illustrated in FIG. 13, each of the detecting devices 201-$i$ analyzes a movement trajectory of each of the users, determines whether each of the users is evacuating, and determines whether each of the users is an evacuee. The case where the detecting device 201-2 determines whether each of the users is an evacuee is described below as an example.

For example, the detecting device 201-2 acquires a relative position of each of the users to the evacuation site that is the closest to the predetermined user at the time t-1. For example, the detecting device 201-2 acquires a relative position of each of the users to the evacuation site that is the closest to the predetermined user at the next time t. For example, the detecting device 201-2 calculates, based on the relative positions of the users at the time t-1 and the relative positions of the users at the time t, a movement speed of each of the users who move to the evacuation site that is the closest to the predetermined user.

For example, when the calculated movement speeds are equal to or higher than a certain speed, the detecting device 201-2 determines that the users are evacuees. When the calculated movement speeds are lower than the certain speed, the detecting device 201-2 determines that the users are not evacuees. It is considered that an interval between the time t-1 and the time t is set to a relatively long interval in order to reduce an error. The interval between the time t-1 and the time t is, for example, 10 minutes. Refer to the description of FIG. 14.

Figure 14:
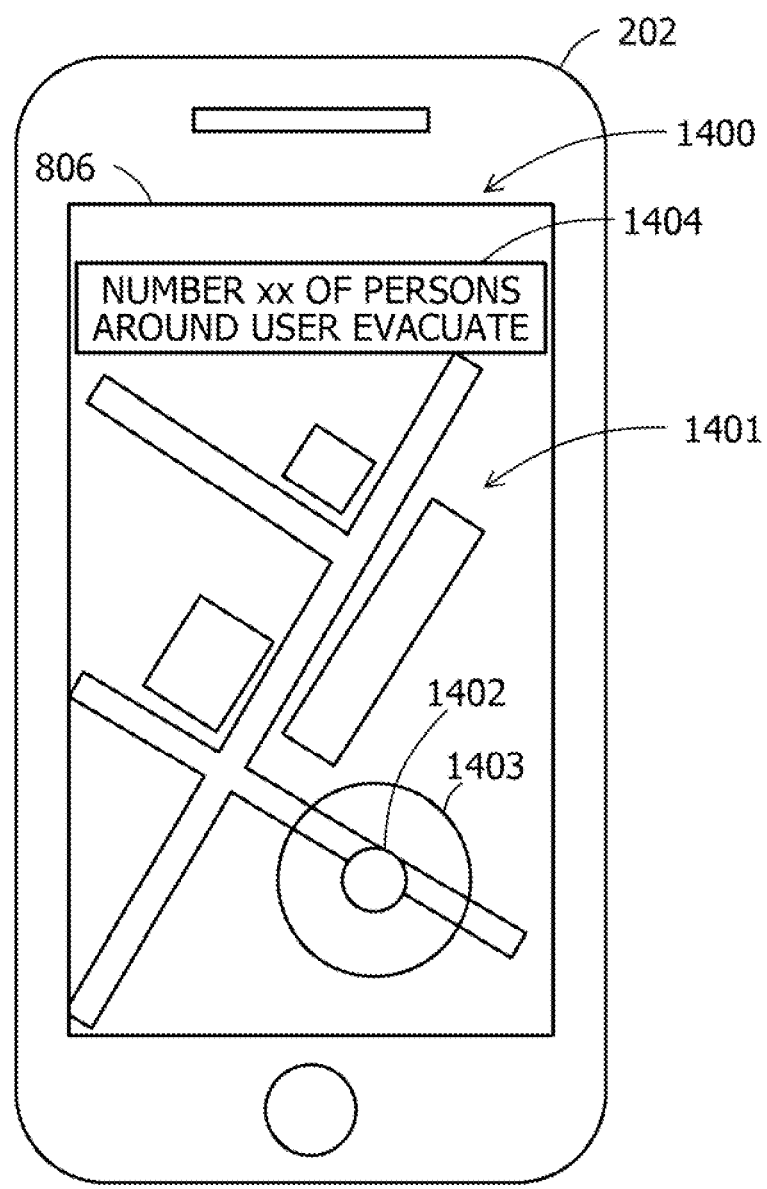
FIG. 14 is a fourth explanatory diagram illustrating the example of the operations of the evacuation support system.

In FIG. 14, the terminal device 202 receives, as display information, the number Ci of evacuees for the target i from the information processing device 100 and displays the number Ci of evacuees on the display 806. In the example illustrated in FIG. 14, the terminal device 202 receives the number C1 of evacuees for the target 1 from the information processing device 100. The terminal device 202 displays the number C1 of evacuees for the target 1 on a viewing screen 1400 of the display 806 so that the target 1 is able to be identified.

The viewing screen 1400 includes a region 1401 indicating a map, a mark 1402 indicating the current position of the predetermined user on the map, a mark 1403 surrounding the target 1 and enabling the target 1 to be identified, and a message 1404 indicating the number C1 of evacuees for the target 1. Therefore, the predetermined user may references the viewing screen 1400, recognize the number C1 of evacuees for the target 1, and appropriately determine whether to evacuate.

In the foregoing manner, the information processing device 100 may enable the predetermined user to appropriately determine whether to evacuate. For example, the information processing device 100 may select information to be included in output information, based on the acquired numbers of evacuees for the targets and the importance levels set for the targets, and may enable the predetermined user to appropriately determine whether to evacuate.

For example, the information processing device 100 may cause, based on the scores, information that is to be output to include information that has a large effect of prompting the predetermined user to evacuate and is included in information on the acquired numbers of evacuees for the targets. As a result, the information processing device 100 may cause the information that is to be output to include information on the acquired number of evacuees for a target that is among the plurality of targets and for which an effect of prompting the predetermined user to evacuate is comprehensively determined to be the largest based on the numbers of evacuees and the importance levels.

For example, regarding the Great East-Japan Earthquake and Tsunami that has occurred on Mar. 11, 2011, the top three reasons for evacuation of residents are that "residents felt big shakes (44%)", "families or neighbors said that they would evacuate (26%)", and "neighbors were evacuating (22%)". On the other hand, importance was not placed on the reasons that "residents watched televisions or listened to radios (7%)", "firefighters called on residents to evacuate (10%)", "companies and co-workers called on residents to evacuate (5%)", and "persons working for public offices called on residents to evacuate (3%)". Therefore, it is considered that residents tend to place importance on information from familiar information resources.

For example, the information processing device 100 may reflect the foregoing tendency in the importance levels and cause the information that is to be output to include information that is determined to have a large effect of prompting the predetermined user to evacuate and indicates the number of evacuees for any of the targets. The information processing device 100 may enable information that is determined to have a large effect of prompting the predetermined user to evacuate and indicates the number of evacuees for any of the targets to be visualized in the terminal device 202, and may enable the predetermined user to recognize the information.

It has been difficult for the predetermined user to recognize evacuation statuses of residents other than the relatives, friends, and acquaintances of the predetermined user. On the other hand, the information processing device 100 may enable the predetermined user to relatively easily recognize evacuation statuses of residents other than the relatives, friends, and acquaintances of the predetermined user. Therefore, the information processing device 100 may enable the predetermined user to recognize information that may enable the predetermined user to appropriately determine whether to evacuate, regardless of factors, such as a location where a home of the predetermined user exists, a range of relationships between the predetermined user and the relatives, and a range of relationships between the predetermined user and the acquaintances.

When the number of evacuees is relatively small, the predetermined user may feel relieved and it may be difficult for the predetermined user to appropriately determine whether to evacuate. Therefore, when the number of evacuees for the target i is equal to or larger than a threshold, the information processing device 100 may select, as display information, the number of evacuees for the target i. The threshold is, for example, 50 persons. Different thresholds may be used for the targets i. Therefore, the information processing device 100 may inhibit the predetermined user from being late to evacuate.

Although the case where the terminal device 202 displays the number Ci of evacuees for the target i on the display 806 is described above, the terminal device 202 is not limited to this. For example, the terminal device 202 may use a speaker to output audio indicating the number Ci of evacuees for the target i. For example, the terminal device 202 may emit a sound, light, vibration, or the like that has an intensity based on the number Ci of evacuees for the target i.

(Another Example of Operations of Evacuation Support System 200)

Next, another example of operations of the evacuation support system 200 is described. The information processing device 100 may select, as display information, the rate $\Delta Ci$ (%) of increase in the number $C_i$ of evacuees for each of the targets i, instead of the number $C_i$ of evacuees for each of the targets i.

The detecting devices 201-$i$ periodically calculate the numbers $C_i$ of evacuees for the targets i and transmits the calculated numbers $C_i$ of evacuees for the targets i to the information processing device 100. The following describes the case where n=4. The information processing device 100 periodically receives the number $C_i$ of evacuees for each of the targets i from each of the detecting devices 201-$i$. The information processing device 100 calculates, for each of the targets i, the rate $\Delta C_i$ (%) of increase in the number of evacuees for the target i based on the number $C_i$ of evacuees for the target i at the time t and the number $C_i$ of evacuees for the target i at the time t-1.

The information processing device 100 calculates a score $W_i \times \Delta C_i$ for each of the targets i. $W_i$ indicates an importance level for the target i. The importance level $W_i = 1.0/C_{imax} + b_i$. $C_{imax}$ is the maximum value of the number of persons that may be present in the target i, $b_i$ is a coefficient set for the target i based on the area of the target i or the area of a region that is based on the position of the user and includes the target i, $b_i$ may be a coefficient set based on a distance between a position based on the user and the target i, $b_i = 10/L_{nmax}$. $L_{nmax}$ is the area of the target i, the area of a region that is based on the position of the user and includes the target i, a distance between the position based on the user and the target i, or the like.

The information processing device 100 selects, as display information, the number $C_i$ of evacuees for the target i for which the maximum calculated score $W_i \times \Delta C_i$ is calculated. The information processing device 100 transmits, to the terminal device 202, the rate $\Delta C_i$ of increase in the number $C_i$, selected as the display information, of evacuees for the target i. The terminal device 202 displays the rate $\Delta C_i$ of increase in the number $C_i$ of evacuees for the target i on the display 806 in the same manner as that described with reference to FIG. 14. For example, the terminal device 202 displays a message indicating that "one evacuee has started evacuating every minute" or that "10 persons are expected to start evacuating after 10 minutes from now", or the like, instead of the message 1404.

For example, the following case is considered. A target A is a range that has a radius of 10 [km^2] and has its center at the position of the user, 100 persons are present in the target A, the rate of increase in the number of evacuees for the target A is 200%, a target B is a range that has a radius of 200 [km^2] and has its center at the position of the user, 1000 persons are present in the target B, and the rate of increase in the number of evacuees for the target B is 300%. In this case, the information processing device 100 calculates $(1.0/100+10/10)*200=202.0$ as a score of the target A and calculates $(1.0/1000+10/200)*300=15.3$ as a score of the target B.

The information processing device 100 selects, as display information, the rate of increase in the number of evacuees for the target A for which the maximum score is calculated, and transmits the selected rate to the terminal device 202. Therefore, the information processing device 100 may enable the predetermined user to easily feel a sense of danger due to the rate of increase in the number of evacuees and to appropriately determine whether to evacuate.

When the rate of increase in the number of evacuees is relatively low, the predetermined user may feel relieved and it may be difficult for the predetermined user to appropriately determine whether to evacuate. Therefore, when the rate of increase in the number of evacuees for the target i is equal to or higher than a threshold, the information processing device 100 may select, as display information, the rate of increase in the number of evacuees for the target i. The threshold is, for example, 200%. Different thresholds may be used for the targets i. Therefore, the information processing device 100 may inhibit the predetermined user from being late to evacuate.

Next, an example of effects produced by the information processing device 100 is described with reference to FIGS. 15 and 16.

Figure 15:
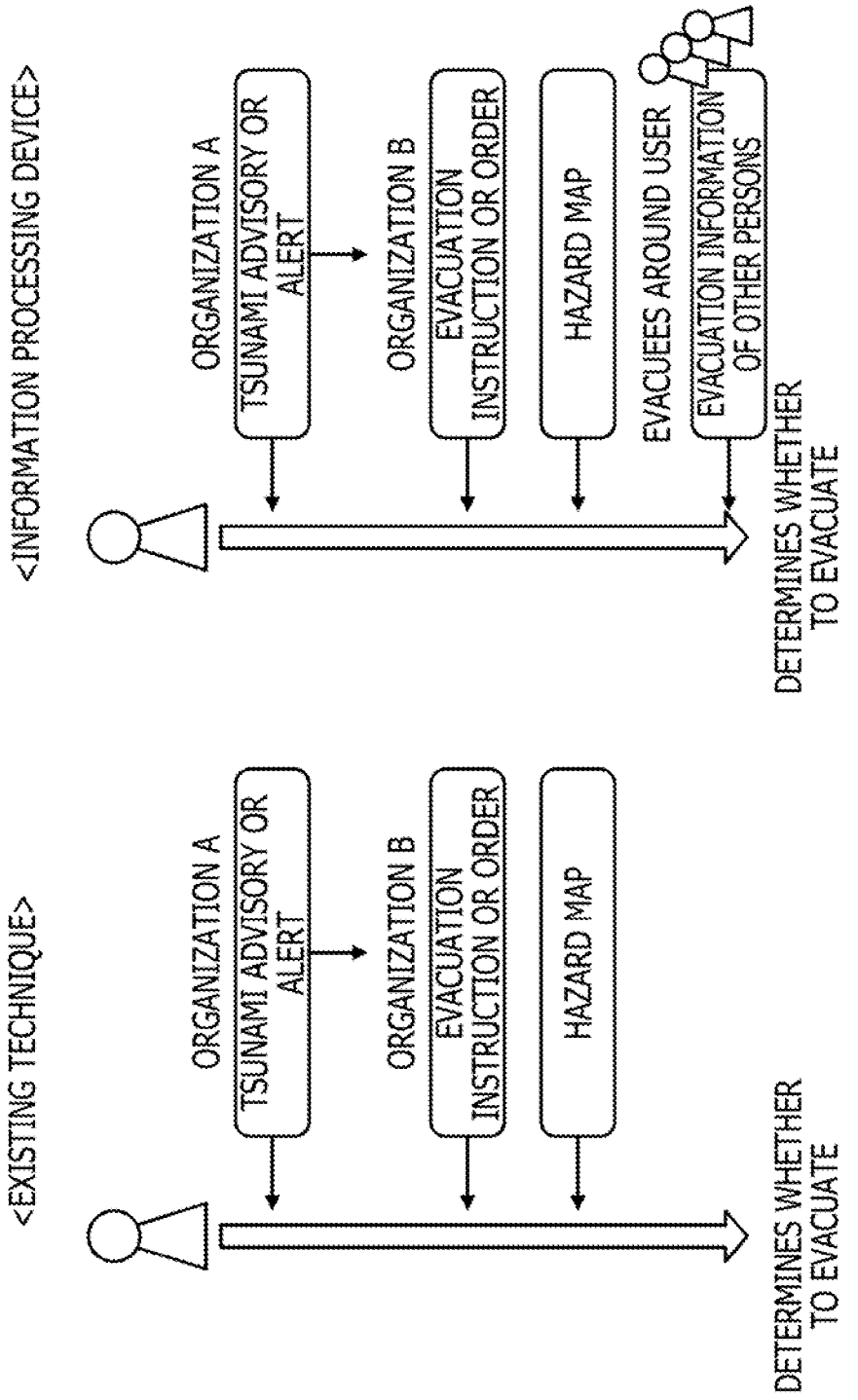
FIG. 15 is a first explanatory diagram illustrating an example of effects produced by the information processing device.
Figure 16:
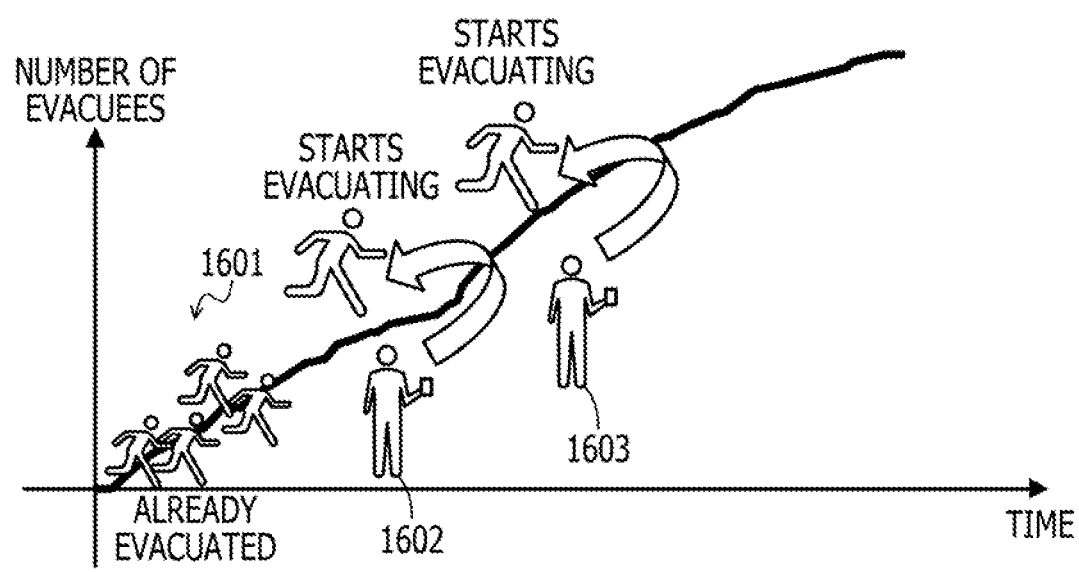
FIG. 16 is a second explanatory diagram illustrating the example of the effects produced by the information processing device.

FIGS. 15 and 16 are explanatory diagrams illustrating the example of the effects produced by the information processing device 100. As illustrated in FIG. 15, in an existing technique, the predetermined user references only a tsunami advisory or alert issued by an organization A, an evacuation instruction or order issued by an organization B, and a hazard map, and determines whether to evacuate.

On the other hand, according to the information processing device 100, the predetermined user may reference evacuation information indicating evacuation statuses of other persons as well as a tsunami advisory or alert issued by the organization A, an evacuation instruction or order issued by the organization B, and a hazard map, and may determine whether to evacuate. Therefore, the information processing device 100 may enable the predetermined user to appropriately determine whether to evacuate. Refer to the description of FIG. 16.

As illustrated in FIG. 16, since an evacuee 1601 is present, the information processing device 100 may have a positive effect on a user 1602 who has not yet evacuated, due to majority synching bias, and may enable the user 1602 to evacuate and may increase the number of evacuees. Since the information processing device 100 increases the number of evacuees, the information processing device 100 may have a series of positive effects on a user 1603 who has not yet evacuated, due to majority synching bias, and may enable the user 1603 to evacuate. In this manner, the information processing device 100 may increase the number of evacuees over time. Therefore, the information processing device 100 may suppress the occurrence of damage from disasters.

Although the case where the importance level $W_i$ set for the target i becomes smaller, as the area of the target i, the area of a region that includes the target i and is based on the position of the user, a distance between a position based on the user and the target i, or the like becomes larger is described above, the embodiment is not limited to this. For example, the importance level $W_i$ set for the target i may become smaller as the area of the target i, the area of a region that includes the target i and is based on the position of the user, a distance between the position based on the user and the target i, or the like becomes smaller.

For example, a disaster, such as a large typhoon, tends to affect a large range and approaches users over a relatively long time period, and the uncertainty of the disaster is relatively high. It is considered, when such a disaster occurs, an effect of prompting users to evacuate by prompting the users to reference evacuation statuses of other persons in a relatively large range is determined to be higher than an effect of prompting the users to evacuate by prompting the users to reference evacuation statuses of other persons in a relatively small range. For example, it is considered that the user is present in the eastern Japan, references evacuation statuses in the western Japan on which a typhoon made landfall, and determines whether to evacuate. In this case, it is preferable that the importance level $W_i$ becomes smaller as the area of the target i, the area of a region that includes the target i and is based on the position of the user, a distance between the position based on the user and the target i, or the like becomes smaller.

Although the case where each of the importance levels Wi is 1.0/Cimax+bi is described above, the importance levels Wi are not limited to this. For example, each of the importance levels Wi may be calculated using either Cimax or bi. For example, each of the importance levels Wi may be 1.0/Cimax. For example, each of the importance levels Wi may be bi.

(Entire Process Procedure)

Next, an example of an entire process procedure to be executed by the information processing device 100 is described with reference to FIG. 17. The entire process is, for example, enabled by the CPU 301, a storage region, such as the memory 302 or the recording medium 305, and the network I/F 303 that are illustrated in FIG. 3.

Figure 17:
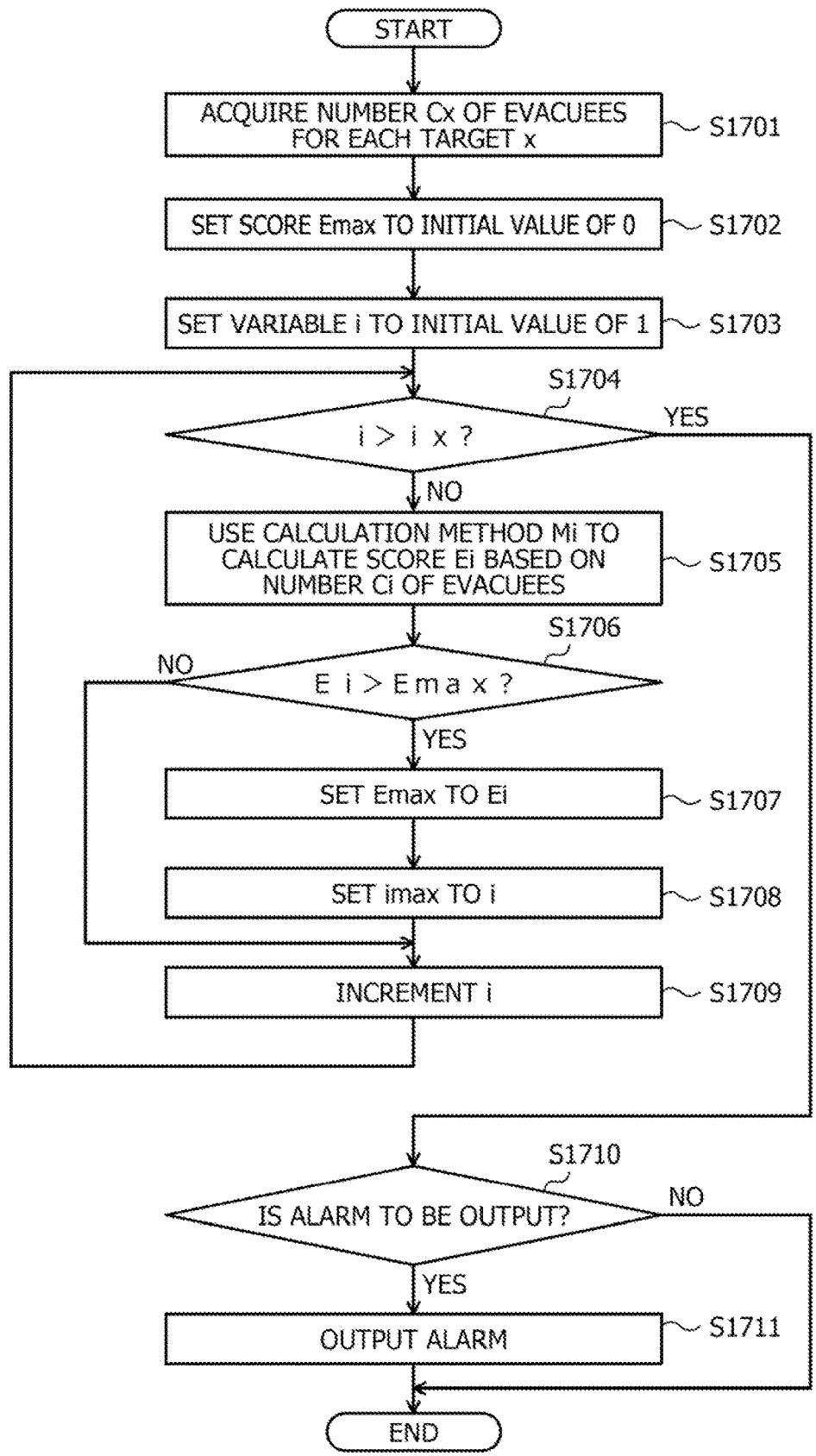
FIG. 17 is a flowchart illustrating an example of an entire process procedure.

FIG. 17 is a flowchart illustrating the example of the entire process procedure. In FIG. 17, the information processing device 100 acquires the number Cx of evacuees for each of targets x (step S1701).

The information processing device 100 sets a score Emax to an initial value of 0 (step S1702). The information processing device 100 sets a variable i to an initial value of 1 (step S1703).

The information processing device 100 determines whether i>ix (step S1704), ix is the number of targets. When i>ix (Yes in step S1704), the information processing device 100 causes the process to proceed to a process of step S1710. On the other hand, when i≤ix (No in step S1704), the information processing device 100 causes the process to proceed to a process of step S1705.

The information processing device 100 uses a calculation method Mi to calculate a score Ei based on the number Ci of evacuees (step S1705). The calculation method Mi is, for example, a method for calculating the score Ei for the target i based on the number Ci of evacuees for the target i.

The information processing device 100 determines whether Ei>Emax (step S1706). When Ei≤Emax (No in step S1706), the information processing device 100 causes the process to proceed to a process of step S1709. On the other hand, when Ei>Emax (Yes in step S1706), the information processing device 100 causes the process to proceed to a process of step S1707.

The information processing device 100 sets Emax to Ei (step S1707). The information processing device 100 sets imax to i (step S1708). After step S1708, the information processing device 100 causes the process to proceed to the process of step S1709.

The information processing device 100 increments i (step S1709). After step S1709, the information processing device 100 causes the process to return to the process of step S1704.

The information processing device 100 determines whether to output an alarm based on Cimax (step S1710). For example, when Cimax is equal to or larger than a threshold, the information processing device 100 determines to output the alarm. For example, when Cimax is smaller than the threshold, the information processing device 100 determines not to output the alarm.

When the information processing device 100 determines not to output the alarm (No in step S1710), the information processing device 100 terminates the entire process. When the information processing device 100 determines to output the alarm (Yes in step S1710), the information processing device 100 causes the process to proceed to a process of step S1711.

The information processing device 100 outputs the alarm (step S1711). After step S1711, the information processing device 100 terminates the entire process. Therefore, the information processing device 100 may enable the predetermined user to appropriately determine whether to evacuate.

(Determination Process Procedure)

Next, an example of a determination process procedure to be executed by the information processing device 100 is described with reference to FIG. 18. The determination process, for example, enabled by the CPU 301, a storage region, such as the memory 302 or the recording medium 305, and the network I/F 303 that are illustrated in FIG. 3.

Figure 18:
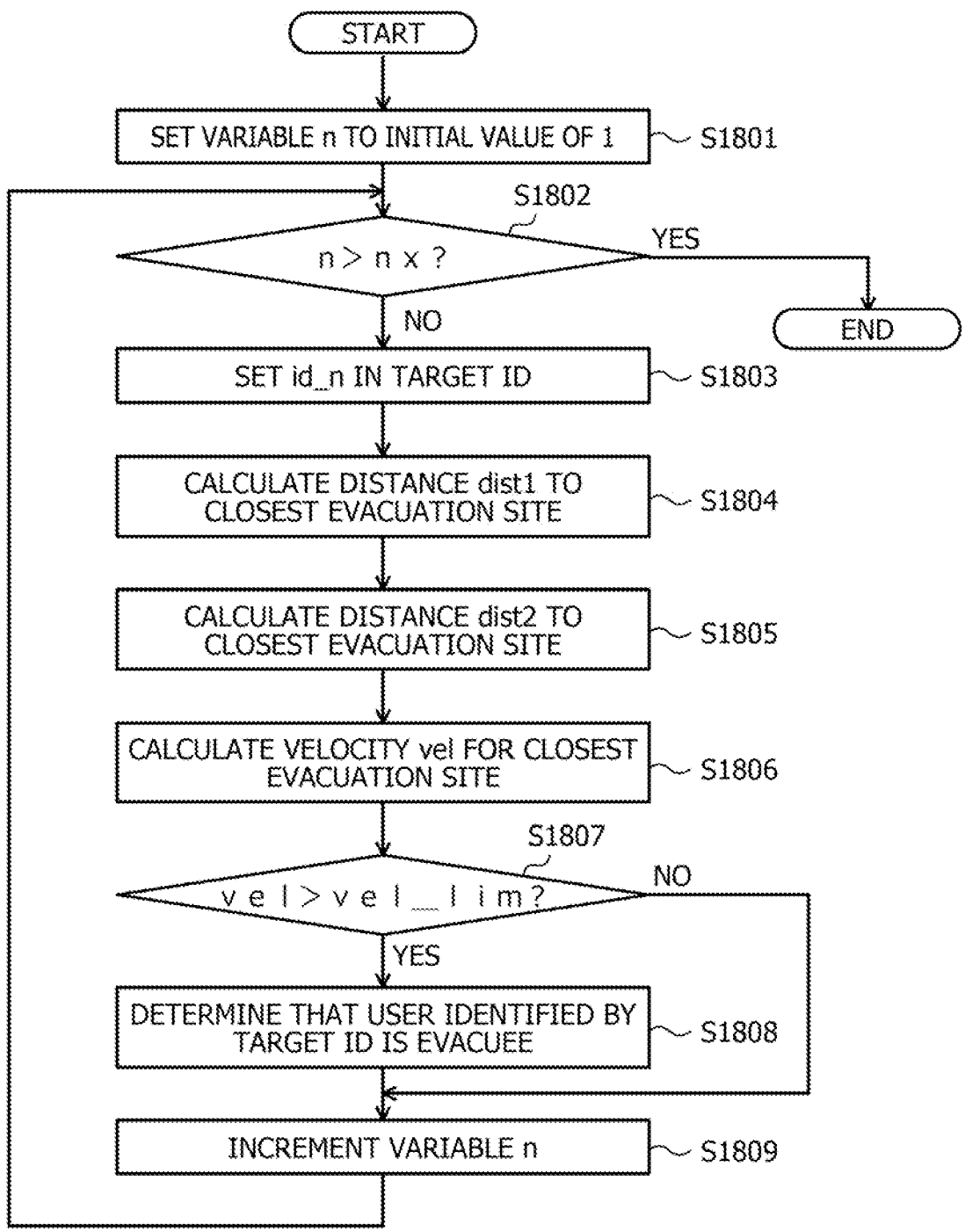
FIG. 18 is a flowchart illustrating an example of a determination process procedure.

FIG. 18 is a flowchart illustrating the example of the determination process procedure. In FIG. 18, the information processing device 100 sets a variable n to an initial value of 1 (step S1801).

The information processing device 100 determines whether n>nx (step S1802), nx is the number of users. When n>nx (Yes in step S1802), the information processing device 100 terminates the determination process. On the other hand, when n≤nx (No in step S1802), the information processing device 100 causes the process to proceed to a process of step S1803.

The information processing device 100 sets id_n in a target ID (step S1803).

The information processing device 100 references the evacuation site management table 400 and the user information management table 500 and calculates a distance dist1 from the position (x(t), y(t)) of a user identified by the target ID to an evacuation site that is the closest to the user (step S1804). The information processing device 100 references the evacuation site management table 400 and the user information management table 500 and calculates a distance dist2 from the position (x(t-1), y(t-1)) of the user identified by the target ID to the evacuation site that is the closest to the user (step S1805).

The information processing device 100 calculates a velocity vel=(dist1−dist2)/(t−(t-1)) for the evacuation site that is the closest to the user identified by the target ID (step S1806).

The information processing device 100 determines whether vel>vel_lim (step S1807). When vel≤vel_lim (No in step S1807), the information processing device 100 causes the process to proceed to a process of step S1809. On the other hand, when vel>vel_lim (Yes in step S1807), the information processing device 100 causes the proceed to a process of step S1808.

The information processing device 100 determines that the user identified by the target ID is an evacuee, and sets active in the field for states that is included in a record associated with the target ID in the user information management table 500 (step S1808). After step S1808, the information processing device 100 causes the process to proceed to the process of step S1809.

The information processing device 100 increments the variable n (step S1809), After step S1809, the information processing device 100 causes the process to return to the process of step S1802. Therefore, the information processing device 100 may determine whether the user is an evacuee.

(Counting Process Procedure)

Next, an example of a counting process procedure to be executed by the information processing device 100 is described with reference to FIG. 19. The counting process is, for example, enabled by the CPU 301, a storage region, such as the memory 302 or the recording medium 305, and the network I/F 303 that are illustrated in FIG. 3.

Figure 19:
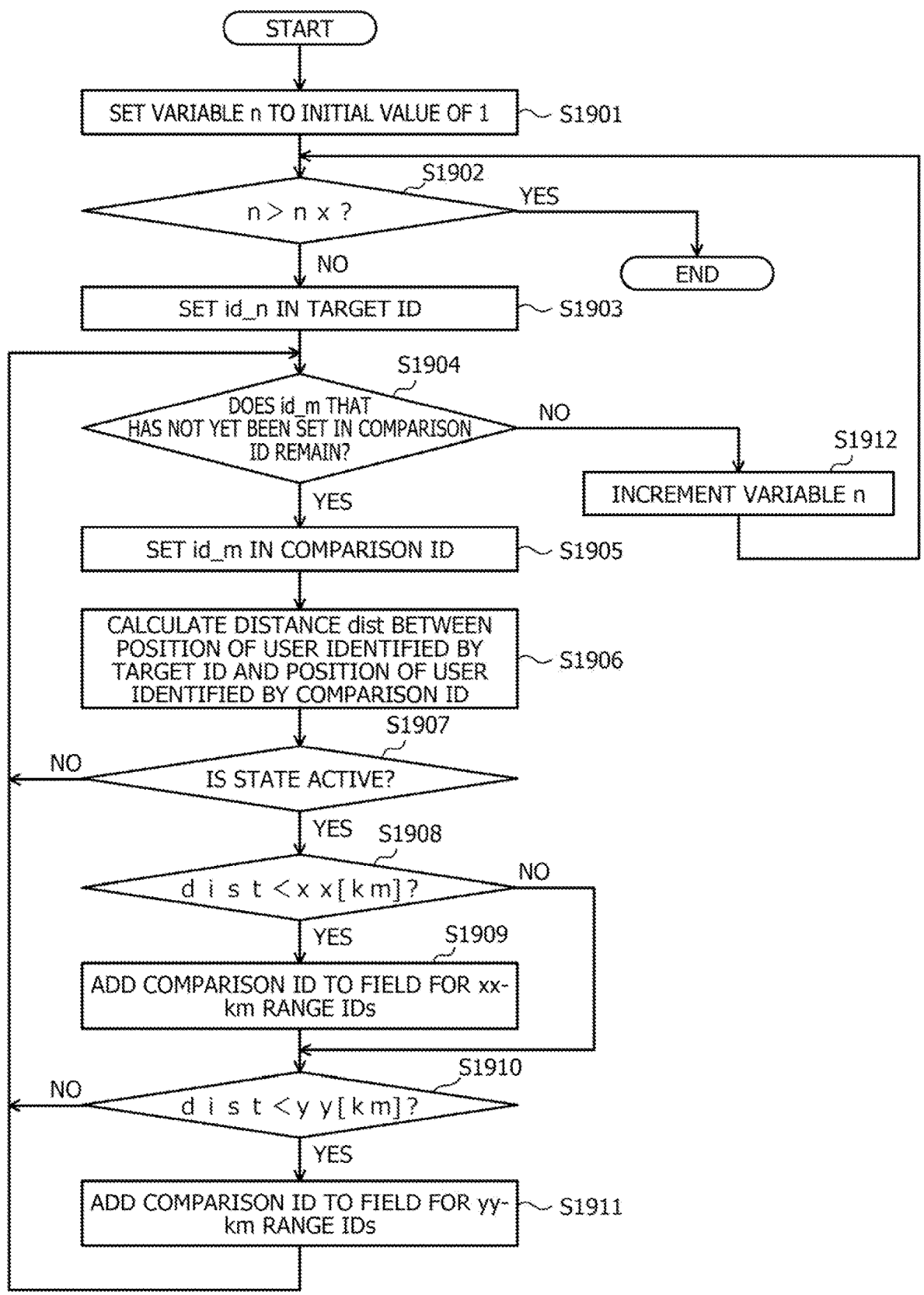
FIG. 19 is a flowchart illustrating an example of a counting process procedure.

FIG. 19 is a flowchart illustrating the example of the counting process procedure. In FIG. 19, the information processing device 100 sets the variable n to the initial value of 1 (step S1901).

The information processing device 100 determines whether n>nx (step S1902). When n>nx (Yes in step S1902), the information processing device 100 terminates the counting process. On the other hand, when n≤nx (No in step S1902), the information processing device 100 causes the process to a process of step S1903.

The information processing device 100 sets id_n in a target ID (step S1903).

The information processing device 100 determines whether id_m that has not yet been set in a comparison ID remains (step S1904), id_n≠id_m. When id_m that has not yet been set does not remain (No in step S1904), the information processing device 100 causes the process to proceed to a process of step S1912. On the other hand, when id_m that has not yet been set remains (Yes in step S1904), the information processing device 100 causes the process to proceed to a process of step S1905.

The information processing device 100 sets id_m in the comparison ID (step S1905). The information processing device 100 references the user information management table 500 and calculates a distance dist between the position of a user identified by the target ID and the position of a user identified by the comparison ID (step S1906).

The information processing device 100 references the user information management table 500 and determines whether the state of the user identified by the comparison ID is active (step S1907). When the state is not active (No in step S1907), the information processing device 100 causes the process to return to the process of step S1904. On the other hand, when the state is active (Yes in step S1907), the information processing device 100 causes the process to proceed to a process of step S1908.

The information processing device 100 determines whether dist<xx [km] (step S1908), When dist≥xx [km] (No in step S1908), the information processing device 100 causes the process to proceed to a process of step S1910. On the other hand, when dist<xx [km] (Yes in step S1908), the information processing device 100 causes the process to proceed to a process of step S1909.

The information processing device 100 adds the comparison ID to the field for xx-km range IDs that is included in a record associated with the target ID in the peripheral information management table 600 (step S1909). After step S1909, the information processing device 100 causes the process to proceed to the process of step S1910.

The information processing device 100 determines whether dist<yy [km] (step S1910). When dist≥yy [km] (No in step S1910), the information processing device 100 causes the process to return to the process of step S1904. On the other hand, when dist<yy [km] (Yes in step S1910), the information processing device 100 causes the process to proceed to a process of step S1911.

The information processing device 100 adds the comparison ID to the field for yy-km range IDs that is included in the record associated with the target ID in the peripheral information management table 600 (step S1911). After step S1911, the information processing device 100 causes the process to return to the process of step S1904.

The information processing device 100 increments the variable n (step S1912). After step S1912, the information processing device 100 causes the process to return to the process of step S1902. Therefore, the information processing device 100 may calculate the number of evacuees.

For example, the information processing device 100 may count, for the predetermined user, the number of IDs set in the field for xx-km range IDs in the peripheral information management table 600, thereby calculating the number of evacuees present in a range that has a radius of xx km and has its center at the position of the predetermined user. For example, the information processing device 100 may count, for the predetermined user, the number of IDs set in the field for yy-km range IDs in the peripheral information management table 600, thereby calculating the number of evacuees present in a range that has a radius of yy km and its center at the position of the predetermined user.

The information processing device 100 may execute the processes illustrated in the flowcharts of FIGS. 17 to 19 such that the order of some of the processes of the steps illustrated in the flowcharts of FIGS. 17 to 19 is different from that illustrated in FIGS. 17 to 19. For example, the information processing device 100 may execute the process of step S1703 before the execution of the process of step S1702. The information processing device 100 may omit a process of a step included in each of the flowcharts illustrated in FIGS. 17 to 19. For example, the process of step S1710 may be omitted.

As described above, the information processing device 100 may acquire the number of evacuees for each of the plurality of targets corresponding to the predetermined user. The information processing device 100 may select any of the plurality of targets based on the acquired numbers of evacuees for the targets and the importance levels set for the targets. The information processing device 100 may associate information on the selected target with information on the acquired number of evacuees for the selected target, and output the information on the selected target and the information on the acquired number of evacuees for the selected target to the user. Therefore, the information processing device 100 may enable the predetermined user to appropriately determine whether to evacuate. For example, the information processing device 100 may select information to be output, based on the acquired numbers of evacuees for the targets and the importance levels set for the targets, and may enable the predetermined user to appropriately determine whether to evacuate.

The information processing device 100 may use, for each of the importance levels set for the targets, a value set based on a positional relationship between the position corresponding to the user and the position of a site corresponding to the target for which the importance level is set. Therefore, the information processing device 100 may treat, as information to be output, information that has a large effect of prompting the predetermined user to evacuate, based on the positional relationships with the predetermined user. Therefore, the information processing device 100 may improve the effect of prompting the predetermined user to evacuate.

The information processing device 100 may use, for each of the importance levels set for the targets, a set value that becomes larger as a distance between the position corresponding to the user and a site corresponding to the target for which the importance level is set becomes shorter. The information processing device 100 may select any of the plurality of targets such that the target is more easily selected from among the plurality of targets as the acquired number of evacuees for the target becomes larger and that the target is more easily selected as the value of the importance level set for the target becomes larger. Therefore, when the predetermined user tends to place importance on the number of evacuees for a target having a relatively close positional relationship with the predetermined user, the information processing device 100 may effectively prompt the predetermined user to evacuate.

The information processing device 100 may use, for a first target among a plurality of targets, a predetermined range including a position corresponding to a user. Therefore, the information processing device 100 may use a target having a relatively deep relationship with the predetermined user.

The information processing device 100 may use, for a second target among the plurality of targets, an evacuation destination that is the closest to the position corresponding to the user. Therefore, the information processing device 100 may use a target having a relatively deep relationship with the predetermined user.

The information processing device 100 may use, for a third target among the plurality of targets, a plurality of evacuation destinations present in a first range that is based on the position corresponding to the user. Therefore, the information processing device 100 may use a target present in a relatively large range.

The information processing device 100 may use, for a fourth target among the plurality of targets, a plurality of evacuation destinations present in a second range that is larger than the first range and based on the position corresponding to the user. Therefore, the information processing device 100 may use a target present in a relatively large range.

The information processing device 100 may determine whether the acquired number of evacuees for the selected target is equal to or larger than a threshold. When the number of evacuees is equal to or larger than the threshold, the information processing device 100 may associate information on the selected target with information on the acquired number of evacuees for the selected target, and output the information on the selected target and the information on the acquired number of evacuees for the selected target to the user. Therefore, the information processing device 100 may inhibit the predetermined user from feeling a sense of danger and inhibit the predetermined user from being late to evacuate.

The information processing device 100 may calculate the rate of increase in the number of evacuees for each of the targets based on the numbers of evacuees that have been acquired for each of the targets at different time points. The information processing device 100 may select any of the plurality of targets based on the calculated rates of increase in the numbers of evacuees for the targets and the importance levels set for the targets. Therefore, the information processing device 100 may enable the predetermined user to easily feel a sense of danger due to the rate of increase in the number of evacuees and enable the predetermined user to easily evacuate.

The information processing device 100 may determine whether the rate, calculated for the selected target, of increase in the number of evacuees is equal to or higher than a threshold. When the rate is equal to or higher than the threshold, the information processing device 100 may associate information on the selected target with information on the acquired number of evacuees for the selected target, and output the information on the selected target and the information on the acquired number of evacuees for the selected target to the user. Therefore, the information processing device 100 may inhibit the predetermined user from feeling a sense of danger and inhibit the predetermined user from being late to evacuate.

The information processing device 100 may select only one of the plurality of targets. The information processing device 100 may not output, to the user, information on the acquired number of evacuees for a remaining target that is among the plurality of targets and is not the selected target. The information processing device 100 may associate information on the selected target with information on the acquired number of evacuees for the selected target, and output the information on the selected target and the information on the acquired number of evacuees for the selected target to the user. Therefore, the information processing device 100 may not treat, as information to be output to the predetermined user, information on the number of evacuees for a target that is among the plurality of targets and for which an effect of prompting the predetermined user to evacuate is relatively small. Therefore, the information processing device 100 may effectively prompt the predetermined user to evacuate.

The information processing device 100 may acquire the positions of the plurality of terminal devices 202 that have been detected by a predetermined detecting device 201 at different time points. The information processing device 100 may determine whether each of the users corresponding to the plurality of terminal devices 202 is an evacuee for any of the plurality of targets, based on the positions of the plurality of terminal devices 202. The information processing device 100 may acquire the number of evacuees for any of the targets based on the results of the determination. Therefore, the information processing device 100 may count the number of evacuees who are evacuating. The information processing device 100 may provide the method for counting evacuees and may be used in various situations.

The information processing device 100 may acquire the number of evacuees for any of the plurality of targets based on a result of analyzing an Image captured by the predetermined imaging device. Therefore, the information processing device 100 may provide the method for counting evacuees and may be used in various situations.

The information processing device 100 may acquire the number of evacuees for any of the plurality of targets based on a result of analyzing data acquired by the predetermined communication device and communicated by each of the plurality of terminal devices 202. Therefore, the information processing device 100 may provide the method for counting evacuees and may be used in various situations.

The information processing device 100 may receive, from each of the plurality of terminal devices 202, a notification indicating that a person corresponding to the terminal device 202 is an evacuee for any of the plurality of targets. The information processing device 100 may acquire the number of evacuees for any of the targets based on the received notifications. Therefore, the information processing device 100 may provide the method for counting evacuees and may be used in various situations.

The information processing method described in the embodiment may be enabled by causing a computer, such as a PC or a workstation, to execute a program prepared in advance. The information processing program described in the embodiment is recorded in a computer-readable recording medium. The information processing program described in the embodiment is read from the recording medium by the computer and executed by the computer. The recording medium is a hard disk, a flexible disk, a compact disc-ROM (CD-ROM), a magneto-optical (MO) disc, a digital versatile disc (DVD), or the like. The information processing program described in the embodiment may be distributed via a network, such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored a program that causes a computer to execute a process comprising:
   acquiring a number of evacuees for each of a plurality of targets corresponding to a predetermined user;
   selecting a target of the plurality of targets based on the acquired numbers of evacuees for the plurality of targets and importance levels respectively set for the plurality of targets; and
   associating information on the selected target with information on the acquired number of evacuees for the selected target and outputting the information on the selected target and the information on the acquired number of evacuees for the selected target to the predetermined user.

2. The recording medium according to claim 1, wherein the importance levels are set respectively for the plurality of targets based on positional relationships between a position corresponding to the predetermined user and sites corresponding to the targets.

3. The recording medium according to claim 1, wherein the importance levels are respectively set for the plurality of targets such that values of the importance levels become larger as distances between a position corresponding to the predetermined user and sites corresponding to the targets become shorter, and
   the selecting includes selecting any of the plurality of targets such that the target is more easily selected from among the plurality of targets as the acquired number of evacuees for the target becomes larger and that the target is more easily selected as the importance level set for the target becomes larger.

4. The recording medium according to claim 1, wherein a first target among the plurality of targets is a predetermined range including a position corresponding to the predetermined user.

5. The recording medium according to claim 1, wherein a second target among the plurality of targets is an evacuation destination that is the closest to a position corresponding to the predetermined user.

6. The recording medium according to claim 1, wherein a third target among the plurality of targets is a plurality of evacuation destinations present in a first range that is based on a position corresponding to the predetermined user.

7. The recording medium according to claim 6, wherein a fourth target among the plurality of targets is a plurality of evacuation destinations present in a second range that is larger than the first range and based on the position corresponding to the predetermined user.

8. The recording medium according to claim 1, wherein the outputting includes associating, when the acquired number of evacuees for the selected target is equal to or larger than a threshold, information on the selected target with information on the acquired number of evacuees for the selected target, and outputting the information on the selected target and the information on the acquired number of evacuees for the selected target to the predetermined user.

9. The recording medium according to claim 1, the process further comprising:
   calculating a rate of increase in the number of evacuees for each of the plurality of targets based on the numbers of evacuees that have been acquired for each of the plurality of targets at different time points, wherein
   the selecting includes selecting any of the plurality of targets based on the calculated rates of increase in the number of evacuees for the plurality of targets and the importance levels set respectively for the plurality of targets.

10. The recording medium according to claim 9, the process further comprising:
    associating, when the rate of increase in the number of evacuees for the selected target is equal to or higher than a threshold, information on the selected target with information on the acquired number of evacuees for the selected target, and outputting the information on the selected target and the information on the acquired number of evacuees for the selected target to the predetermined user.

11. The recording medium according to claim 1, wherein the selecting includes selecting only one of the plurality of targets, and
    the outputting includes associating, without outputting information on the acquired numbers of evacuees for the targets other than the selected one target to the predetermined user, information on the selected one target with information on the acquired number of evacuees for the selected one target, and outputting the information on the selected one target and the information on the acquired number of evacuees for the selected one target to the predetermined user.

12. The recording medium according to claim 1, wherein the acquiring includes
    determining, based on positions of a plurality of terminal devices that have been detected by a predetermined detecting device at different time points, whether each of persons corresponding to each of the plurality of terminal devices is an evacuee for any of the plurality of targets, and
    acquiring the number of evacuees for the target based on a result of the determining.

13. The recording medium according to claim 1, wherein the acquiring includes acquiring the number of evacuees for any of the plurality of targets based on a result of analyzing an image of the target captured by a predetermined imaging device.

14. The recording medium according to claim 1, wherein the acquiring includes acquiring the number of evacuees for any of the plurality of targets based on a result of analyzing data acquired by a predetermined communication device and communicated by each of a plurality of terminal devices each corresponding to each person.

15. The recording medium according to claim 1, wherein the acquiring includes acquiring, based on a notification received from each of a plurality of terminal devices and indicating that a person corresponding to the terminal device is an evacuee for any of the plurality of targets, the number of evacuees for the target.

16. An information processing method for a computer to perform a process comprising:
- acquiring a number of evacuees for each of a plurality of targets corresponding to a predetermined user;
- selecting a target of the plurality of targets based on the acquired numbers of evacuees for the plurality of targets and importance levels respectively set for the plurality of targets; and
- associating information on the selected target with information on the acquired number of evacuees for the selected target and outputting the information on the selected target and the information on the acquired number of evacuees for the selected target to the predetermined user.

17. An information processing apparatus comprising:
a memory, and
a processor couple to the memory and configured to:
acquire a number of evacuees for each of a plurality of targets corresponding to a predetermined user;
select a target of the plurality of targets based on the acquired numbers of evacuees for the plurality of targets and importance levels respectively set for the plurality of targets; and
associate information on the selected target with information on the acquired number of evacuees for the selected target and output the information on the selected target and the information on the acquired number of evacuees for the selected target to the predetermined user.

* * * * *